(12) United States Patent
Reisslein et al.

(10) Patent No.: US 11,671,896 B2
(45) Date of Patent: Jun. 6, 2023

(54) SYSTEMS AND METHODS FOR A LAYERED SDN-BASED BACKHAUL ARCHITECTURE FOR SMALL CELLS

(71) Applicants: Martin Reisslein, Tempe, AZ (US); Akhilesh Thyagaturu, Tempe, AZ (US)

(72) Inventors: Martin Reisslein, Tempe, AZ (US); Akhilesh Thyagaturu, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 74 days.

(21) Appl. No.: 17/066,197

(22) Filed: Oct. 8, 2020

(65) Prior Publication Data

US 2021/0029613 A1 Jan. 28, 2021

Related U.S. Application Data

(62) Division of application No. 15/780,503, filed as application No. PCT/US2016/064590 on Dec. 2, 2016, now Pat. No. 10,805,859.

(60) Provisional application No. 62/299,905, filed on Feb. 25, 2016.

(51) Int. Cl.
*H04W 40/24* (2009.01)
*H04W 88/14* (2009.01)
*H04W 16/24* (2009.01)
*H04W 92/24* (2009.01)

(52) U.S. Cl.
CPC .......... *H04W 40/24* (2013.01); *H04W 16/24* (2013.01); *H04W 88/14* (2013.01); *H04W 92/24* (2013.01)

(58) Field of Classification Search
None
See application file for complete search history.

(56) References Cited

U.S. PATENT DOCUMENTS

| | | | | |
|---|---|---|---|---|
| 6,804,720 B1* | 10/2004 | Vilander | ................ | G06Q 20/10 |
| | | | | 709/217 |
| 8,090,256 B2 | 1/2012 | Reisslein | | |
| 9,717,088 B2 | 7/2017 | Reisslein | | |
| 9,838,760 B2 | 12/2017 | Seema | | |
| 10,154,368 B1* | 12/2018 | Shah | ....................... | H04W 4/02 |
| 10,306,670 B2 | 5/2019 | Reisslein | | |
| 2005/0084267 A1 | 4/2005 | Fan | | |
| 2010/0322189 A1* | 12/2010 | Qiang | .................. | H04L 63/029 |
| | | | | 370/331 |
| 2015/0071181 A1* | 3/2015 | Nasir | .................... | H04W 28/20 |
| | | | | 370/329 |

(Continued)

OTHER PUBLICATIONS

Gudipati, et al., "SoftRAN: Software defined radio access network," in Proc. ACM SIGCOMM Workshop on Hot Topics in Software Defined Networking, 2013, pp. 25-30.

(Continued)

*Primary Examiner* — Zewdu A Beyen
(74) *Attorney, Agent, or Firm* — Polsinelli PC

(57) ABSTRACT

Various embodiments of a four-step intra-LayBack handover protocol within a given gateway in an SDN-LayBack architecture are disclosed. The intra-LayBack handover reduces the signaling load by 60% in comparison with conventional LTE handover within a given serving gateway.

9 Claims, 7 Drawing Sheets

(56) References Cited

U.S. PATENT DOCUMENTS

2017/0093541 A1* 3/2017 Pan ...................... H04W 76/14

OTHER PUBLICATIONS

Guerzoni, et al., "SDN-based architecture and procedures for 5G networks," in Proc. International Conference on 5G for Ubiquitous Connectivity (5GU), Nov. 2014, pp. 209-214.

Gulati, "A signaling storm is gathering—Is your packet core ready?" 2012. [Online] Available: https://blog.networks.nokia.com/mobile-networks/2012/12/05/a-signaling-storm-is-gathering-is-your-packet-core-ready/.

Gupta, et al., "Fast, accurate simulation for SDN prototyping," in Proc. ACM SIGCOMM Workshop on Hot Topics in Software Defined Networking, 2013, pp. 31-36.

Gupta, et al., "H.264 coarse grain scalable (CGS) and medium grain scalable (MGS) encoded video: a trace based traffic and quality evaluation," IEEE Transactions on Broadcasting, vol. 58, No. 3, pp. 428-439, 2012.

Gupta, et al., "LabVIEW based platform for prototyping dense LTE networks in CROWD project," in Proc. IEEE Eu. Conf. on Networks and Communications (EuCNC), 2014, pp. 1-5.

Hakiri, et al., "Leveraging SDN for the 5G networks: Trends, prospects and challenges," arXiv preprint arXiv:1506.02876, 2015.

Heinzelman, et al., "An application-specific protocol architecture for wireless microsensor networks," IEEE Transactions on Wireless Communications, vol. 1, No. 4, pp. 660-670, Oct. 2002.

Hu, et al., "SDN over IP: Enabling internet to provide better QoS guarantee," in Proc. International Conference on Frontier of Computer Science and Technology (FCST), Aug. 2015, pp. 46-51.

Huang, et al. "Cost minimization for rule caching in software defined networking," IEEE Transactions on Parallel and Distributed Systems, vol. PP, No. 99, pp. 1-1, 2015.

Hurtado-Borras, et al., "SDN wireless backhauling for small cells," in Proc. IEEE International Conference on Communications (ICC), 2015, pp. 3897-3902.

Innes, et al., "The Arizona Science Lab (ASL): Fieldtrip based STEM outreach with a full engineering design, build, and test cycle," Global Journal of Engineering Education, vol. 14, No. 3, pp. 225-232, 2012.

Irmer, et al., "Coordinated multipoint: Concepts, performance, and field trial results," IEEE Communications Magazine, vol. 49, No. 2, pp. 102-111, Feb. 2011.

Jafari, et al., "Small cell backhaul: chalglenges and prospective solutions," EURASIP Journal on Wireless Communications and Networking, vol. 2015, No. 1, pp. 1-18, 2015.

Jain, et al., "Machine type communications in 3GPP systems," IEEE Communications Magazine, vol. 50, No. 11, pp. 28-35, Nov. 2012.

Jeffers, et al., "Understanding K-12 engineering outreach programs," Journal of Professional Issues in Engineering Education and Practice, vol. 130, No. 2, pp. 95-108, 2004.

Jermyn, et al., "Scalability of machine to machine systems and the internet of things on LTE mobile networks," in Proc. IEEE International Symposium on a World of Wireless, Mobile and Multimedia Networks (WoWMoM), Jun. 2015, pp. 1-9.

Johnson, et al., "Introductory circuit analysis learning from abstract and contextualized circuit representations: effects of diagram labels," IEEE Transactions on Education, vol. 57, No. 3, pp. 160-168, 2014.

Johnson, et al., "Learning from abstract and contextualized representations: The effect of verbal guidance," Computers in Human Behavior, vol. 29, No. 6, pp. 2239-2247, 2013.

Johnson, et al., "Pedagogical agent signaling of multiple visual engineering representations: The case of the young female agent," ASEE Journal of Engineering Education, vol. 102, No. 2, pp. 319-337, 2013.

Johnson, et al., "Representation sequencing in computer-based engi-neering education," Computers 4 Education, vol. 72, pp. 249-261, 2014.

Johnson, et al., "Supporting multimedia learning with visual signalling and animated pedagogical agent: moderating effects of prior knowledge," Journal of Computer Assisted Learning, vol. 31, No. 2, pp. 97-115, 2015.

Johnson, et al., "Transitional feedback schedules during computer-based problem-solving practice," Computers Education, vol. 81, pp. 270-280, 2015.

Jung, et al., "A network-assisted user-centric wifi-offloading model for maximizing per-user throughput in a heterogeneous network," IEEE Transactions on Vehicular Technology, vol. 63, No. 4, pp. 1940-1945, May 2014.

Jungnickel, et al., "Software-defined open architecture for front- and backhaul in 5G mobile networks," in Proc. Int. Conf. on Transparent Optical Networks (ICTON), Jul. 2014, pp. 1-4.

Jurca, et al., "Video packet selection and scheduling for multipath streaming," IEEE Transactions on Multimedia, vol. 9, No. 3, pp. 629-641, 2007.

Kangasharju, et al., "Distributing layered encoded video through caches," IEEE Transactions on Computers, vol. 51, No. 6, pp. 622-636, 2002.

Karaman, et al., "Quality of service control and resource prioritization with software defined networking," in Proc. IEEE Conference on Network Softwarization (NetSoft), Apr. 2015, pp. 1-6.

Project Floodlight, 2015. [Online]. Available: http://www.projectfloodlight.org/floodlight/.

Pulipaka, et al., "Traffic and statistical multiplexing characterization of 3-D video representation formats," IEEE Transactions on Broadcasting, vol. 59, No. 2, pp. 382-389, 2013.

Pulipaka, et al., "Traffic models for H.264 video using hierarchical prediction structures," in Proc. IEEE GLOBECOM, 2012, pp. 2107-2112.

Purohith, et al., "Network architecture supporting seamless flow mobility between LTE and WiFi networks," in Proc. IEEE International Symposium on a World of Wireless, Mobile and Multimedia Networks (WoWMoM), 2015, pp. 1-9.

Qadir, et al., "Building programmable wireless networks: an architectural sur-vey," EURASIP Journal on Wireless Communications and Networking, vol. 2014, No. 1, pp. 1-31, 2014.

Qiao, et al., "Enabling device-to-device communications in millimeter-wave 5G cellular networks," IEEE Communications Magazine, vol. 53, No. 1, pp. 209-215, Jan. 2015.

Qualcomm, Innovative Inventions that Changed the World. 2019. [Online]. Available: https://www.qualcomm.com/invention/research/pro j ects/small-cells/ultrason.

Rath, et al., "FemtoHaul: Using femtocells with relays to increase macrocell backhaul bandwidth," in Proc. INFOCOM IEEE Conference on Computer Communications Work-shops, 2010, pp. 1-5.

Reisslein, et al., "A framework for guaranteeing statistical QoS," IEEE/ACM Transactions on Networking (TON), vol. 10, No. 1, pp. 27-42, 2002.

Reisslein, et al., "Circuit kit K-12 outreach: Impact of circuit element representation and student gender," IEEE Transactions on Education, vol. 56, No. 3, pp. 316-321, 2013.

Reisslein, et al., "Color coding of circuit quantities in introductory circuit analysis instruction," IEEE Transactions on Education, vol. 58, No. 1, pp. 7-14, 2015.

Reisslein, et al., "Pre-college electrical engineering instruction: The impact of abstract vs. contextualized representation and practice on learning," ASEE Journal of Engineering Education, vol. 99, No. 3, pp. 225-235, 2010.

Riggio, et al., "Interference management in software-defined mobile net-works," in Proc. IFIP/IEEE International Symposium on Integrated Network Management (IM), May 2015, pp. 626-632.

Rodrigues, et al.,"GreenSDN: Bringing energy efficiency to an SDN emulation environment," in Proc. IFIP/IEEE International Symposium on Integrated Network Management (IM), May 2015, pp. 948-953.

Samdanis, et al., "Virtual bearer management for efficient MTC radio and backhaul sharing in LTE networks," in Proc. IEEE International Symposium on Personal Indoor and Mobile Radio Communications (PIMRC), Sep. 2013, pp. 2780-2785.

Seeling, et al., "I. Want. Pixels. (Entering the Age of 4k)," IEEE Potentials, vol. 33, No. 6, pp. 27-30, 2014.

(56) References Cited

OTHER PUBLICATIONS

Seeling, et al., "Network performance evaluation using frame size and quality traces of single-layer and two-layer video: A tutorial," IEEE Communications Surveys a Tutorials, vol. 6, No. 3, pp. 58-78, 2004.
Seeling, et al., "Video network traffic and quality comparison of vp8 and h.264 svc," in Proc. ACM Workshop on Mobile Video Delivery, 2010, pp. 33-38.
Seeling, et al., "Video transport evaluation with 11.264 video traces," IEEE Communications Surveys Tutorials, vol. 14, No. 4, pp. 1142-1165, 2012.
Shankar, et al., "Energy-efficient protocols for wireless communication in biosensor networks," in Proc. IEEE International Symposium on Personal, Indoor and Mobile Radio Communications, vol. 1, Sep. 2001, pp. D-114-D-118.
Shariatmadari, et al., "Machine-type communications: current status and future perspectives toward 5G systems," IEEE Communications Magazine, vol. 53, No. 9, pp. 10-17, Sep. 2015.
Shin, et al., "Per-node throughput enhancement in Wi-Fi densenets," IEEE Communications Magazine, vol. 53, No. 1, pp. 118-125, Jan. 2015.
Shin, et al., "Siesta: Software-defined energy efficient base station control for green cellular networks," in Proc. International Conference on Computer Communication and Networks (ICCCN), Aug. 2015, pp. 1-8.
Simpkins, et al., "Math and science motivation: A longitudinal examination of the links between choices and beliefs," Developmental Psychology, vol. 42, No. 1, pp. 70-83, 2006.
Song, et al., "A cooperative spectrum sensing method for sensing under noise uncertainty and interference," in Proc. International Conference on Advanced Technologies for Communications (ATC), Oct. 2014, pp. 204-207.
Soret, et al., "Interference coordination for dense wireless networks," IEEE Communications Magazine, vol. 53, No. 1, pp. 102-109, Jan. 2015.
Srinivasan, et al., "The effects of priority levels and buffering on the statistical multiplexing of single-layer H.264/AVC and SVC encoded video streams," IEEE Transactions on Broadcasting, vol. 56, No. 3, pp. 281-287, 2010.
Suh, et al., "Efficiency analysis of WiFi offloading techniques," IEEE Transactions on Vehicular Technology, in print, 2015.
Sullivan, et al., "Overview of the high efficiency video coding (HEVC) standard," IEEE Transactions on Circuits and Systems for Video Technology, vol. 22, No. 12, pp. 1649-1668, 2012.
Sun, et al., "A QoE centric distributed caching approach for vehicular video streaming in cellular networks," Wireless Communications and Mobile Computing, in print, 2015.
Taleb, et al., "On alleviating MTC overload in EPS," Ad Hoc Networks, vol. 18, pp. 24-39, 2014.
Thiele, et al., "A unified feedback scheme for distributed interference management in cellular systems: Benefits and challenges for real-time implementation," in Proc. Eu. Signal Processing Conference, Aug. 2009, pp. 1489-1493.
Tipmongkolsilp, et al., "The evolution of cellular backhaul technologies: current issues and future trends," IEEE Communications Surveys 4 Tutorials, vol. 13, No. 1, pp. 97-113, 2011.
Tombaz, et al., "Is backhaul becoming a bottleneck for green wireless access networks?" in Proc. IEEE International Conference on Commu-nications (ICC), 2014, pp. 4029-4035.
Tomici, et al., "Integrated small cell and Wi-Fi networks," in Proc. IEEE Wireless Communications and Networking Conference (WCNC), Mar. 2015.
Tomovic, et al., "SDN control framework for QoS provisioning," in Proc. Telecommunications Forum Telfor (TELFOR), Nov. 2014, pp. 111-114.
Kardeby, et al., "Power consumption for global information dissemination in the internet of things," in Proc. IEEE International Conference on Intelligent Sensors, Sensor Networks and Information Processing (ISSNIP), Apr. 2015, pp. 1-6.
Karthikeyan, et al., "Energy efficient MAC protocol for energy latency tradeoff in wireless sensor network traffic," in Proc. IEEE International Conference on Computational Intelligence Computing Research (ICCIC), Dec. 2012, pp. 1-5.
Keller, et al., "MicroCast: cooperative video streaming on smartphones," in Proc. ACM International Conference on Mobile Systems, Applications, and Services, 2012, pp. 57-70.
Kiaei, et al., "Low-latency polling schemes for long-reach passive optical networks," IEEE Transactions on Communications, vol. 61, No. 7, pp. 2936-2945, 2013.
Klein, "Integrative learning and interdisciplinary studies," Peer Review, vol. 7, No. 4, pp. 8-10, 2005.
Klessig, et al., "Energy efficiency gains through data offloading in hetero-geneous small cell networks," in Proc. IEEE International Conference on Communication Systems (ICCS), Nov. 2014, pp. 117-121.
Laner, et al., "Traffic models for machine type communications," in Proc. Int. Symposium on Wireless Communication Systems (ISWCS), Aug. 2013, pp. 1-5.
Lantz, et al., "A network in a laptop: rapid prototyping for software-defined networks," in Proc. ACM SIGCOMM Workshop on Hot Topics in Networks, 2010.
Larmo, et al., "RAN overload control for machine type communications in LTE," in Proc. IEEE Globecom Workshops (GC Wkshps), Dec. 2012, pp. 1626-1631.
Lateef, et al., "LTE-advanced self-organizing network conflicts and coordination algorithms," IEEE Wireless Communications, vol. 22, No. 3, pp. 108-117, Jun. 2015.
Lee, et al., "Economics of WiFi offloading: Trading delay for cellular capacity," IEEE Transactions on Wireless Communications, vol. 13, No. 3, pp. 1540-1554, Mar. 2014.
Lessmann, et al., "On the benefits of time-varying routing in realistic mobile backhaul networks," in Proc. IEEE Int. Conf. on Communication Workshop (ICCW), 2015, pp. 56-61.
Leung, et al., "Design of an interactive video-on-demand system," IEEE Transactions on Multimedia, vol. 5, No. 1, pp. 130-140, 2003.
Lin, et al., "On using interference-aware spectrum sensing for dynamic spectrum access in cognitive radio networks," IEEE Transactions on Mobile Computing, vol. 12, No. 3, pp. 461-474, Mar. 2013.
Liu, et al. "Heterogeneous network handover using 3GPP ANDSF," in Proc. IEEE International Conference on Advanced Information Networking and Applications (AINA), Mar. 2015, pp. 171-175.
Liu, et al., "A novel multi-service small-cell cloud radio access network for mobile backhaul and computing based on radio-over-fiber technologies," IEEE/OSA Journal of Lightwave Technology, vol. 31, No. 17, pp. 2869-2875, 2013.
Liu, et al., "Small cell traffic balancing over licensed and unlicensed bands," IEEE Transactions on Vehicular Technology, in print, 2015.
Liu, et al., "The case for re-configurable backhaul in cloud-RAN based small cell networks," in Proc. IEEE INFOCOM, 2013, pp. 1124-1132.
Lopez-Perez, et al., "Towards 1 Gbps/UE in cellular systems: Understanding ultra-dense small cell deployments," IEEE Communications Surveys e4 Tutorials, in print, 2015.
Lou, et al., "The impact of problem-based learning strategies on stem knowledge integration and attitudes: an exploratory study among female taiwanese senior high school students," Int. Journal of Technology and Design Education, vol. 21, No. 2, pp. 195-215, 2011.
Maity, et al. "TCP download performance in dense WiFi scenarios," in Proc. International Conference on Communication Systems and Networks (COMSNETS), Jan. 2015, pp. 1-8.
Makris, et al., "A context-aware backhaul management solution for combined H211 and M2M traffic," in Proc. IEEE International Conference on Computer, Information and Telecommunication Systems (CITS), 2013, pp. 1-5.
McGarry, et al., "Ethernet PONs: a survey of dynamic bandwidth allocation (DBA) algorithms," IEEE Communications Magazine, vol. 42, No. 8, pp. S8-15, 2004.
McGarry, et al., "Just-in-time scheduling for multichannel EPONs," IEEE/OSA Journal of Lightwave Technology, vol. 26, No. 10, pp. 1204-1216, 2008.

(56) References Cited

OTHER PUBLICATIONS

Mercian, et al., "Software defined optical access networks (SDOANs): A comprehensive survey," arXiv preprint, arXiv:1511.04376, 2015.

Mi, et al., "No stack: A SDN-based framework for future cellular networks," in Proc. International Symposium on Wireless Personal Multimedia Communications (WPMC), Sep. 2014, pp. 497-502.

Bakiras, et al., "Smoothing and prefetching video from distributed servers," in Proc. IEEE International Conference on Network Protocols (ICNP), 1999, pp. 311-318.

Bansal, et al., "OpenRadio: a programmable wireless dataplane," in Proc. ACM Workshop on Hot Topics in Software Defined Networks, 2012, pp. 109-114.

Bao, et al., "Dataspotting: Exploiting naturally clustered mobile devices to offload cellular traffic," in Proceedings IEEE Infocom, 2013, pp. 420-424.

Barrera, et al., "Auction design for spectrum allocation under interference constraints," in Proc. IEEE Global Communications Conference (GLOBECOM), Dec. 2013, pp. 3035-3041.

Bastug, et al., "Think before reacting: Proactive caching in 5G small cell networks," 2014.

Behjati, et al., "Self-organizing network interference coordination for future LTE-advanced networks," in Proc. IEEE International Symposium on Broadband Multimedia Systems and Broadcast-ing (BMSB), Jun. 2013, pp. 1-5.

Bellavista, et al., "A unifying perspective on context-aware evaluation and management of heterogeneous wireless connectivity," IEEE Communications Surveys e4 Tutorials, vol. 13, No. 3, pp. 337-357, 2011.

Bennis, et al., "When cellular meets WiFi in wireless small cell networks," IEEE Communications Magazine, vol. 51, No. 6, pp. 44-50, Jun. 2013.

Bercovich, et al., "Software-defined wireless transport networks for flexible mobile backhaul in 5G systems," Mobile Networks and Applications, in print, pp. 1-9, 2015.

Bhattacharya, et al. "QoS enhancement using embedded agent in OpenFlow based SDN node," in Proc. IEEE International Conference on Electrical, Computer and Communication Technologies (ICECCT), Mar. 2015, pp. 1-5.

Bhattacharya, et al., "SDN based architecture for QoS enabled services across networks with dynamic service level agreement," in Proc. IEEE International Conference on Advanced Networks and Telecommuncations Systems (ANTS), Dec. 2013, pp. 1-6.

Blenk, et al., "Survey on network virtualization hypervisors for software defined networking," IEEE Communications Surveys 4 Tutorials, in print, 2015.

Bolla, et al., "Fine-grained energy-efficient consolidation in sdn networks and devices," IEEE Transactions on Network and Service Management, vol. 12, No. 2, pp. 132-145, Jun. 2015.

Borges, et al., "Aspirations, challenges, and open issues for software-based 5G networks in extremely dense and heterogeneous scenarios," EURASIP Journal on Wireless Communications and Networking, vol. 2015, No. 1, pp. 1-13, 2015.

Bradai, et al., "Cellular software defined networking: a framework," IEEE Communications Magazine, vol. 53, No. 6, pp. 36-43, Jun. 2015.

Bueno, et al., "An OpenNaaS based SDN framework for dynamic QoS control," in Proc. IEEE SDN for Future Networks and Services (SDN4FNS), Nov. 2013, pp. 1-7.

Caba, et al., "APIs for QoS configuration in software defined networks," in Proc. IEEE Conference on Network Softwarization (NetSoft), Apr. 2015, pp. 1-5.

Cai, et al., "Software defined device-to-device (D2D) communications in virtual wireless networks with imperfect network state information (NSI)," IEEE Transactions on Vehicular Technology, in print, 2015.

Calamari, et al., "Experimental evalu-ation of auction designs for spectrum allocation under interference constraints," in Proc. IEEE Systems and Information Design Symposium (SLEDS), Apr. 2012, pp. 7-12.

Capozzi, et al., "Downlink packet scheduling in LTE cellular networks: Key design issues and a survey," IEEE Communications Surveys Tutorials, vol. 15, No. 2, pp. 678-700, 2013.

Carpa, et al., "Segment routing based traffic engineering for energy efficient backbone networks," in Proc. IEEE International Conference on Advanced Networks and Telecom-muncations Systems (ANTS), Dec. 2014, pp. 1-6.

Chaudet, et al., "Wireless software defined networks: Challenges and opportunities," in Proc. IEEE International Conference on Microwaves, Communications, Antennas and Electronics Systems (COMCAS), Oct. 2013, pp. 1-5.

Chen, et al., "An auction framework for spectrum allocation with interference constraint in cognitive radio networks," in Proceedings IEEE Infocom, Mar. 2010, pp. 1-9.

Cheng, et al., "Energy efficient control for software defined cloud radio access network based on small cell," in Proc. IEEE Vehicular Technology Conference (VTC Spring), 2015, pp. 1-5.

Cheng, et al., "Overload control for machine-type-communications in LTE-advanced system," IEEE Communications Magazine, vol. 50, No. 6, pp. 38-45, Jun. 2012.

Chih-Lin, et al., "Trillions of nodes for 5G!?" in Proc. IEEE/CIC Int. Conf. on Communications in China (ICCC), Oct. 2014, pp. 246-250.

Chikkerur, et al., "Objective video quality assessment methods: A classification, review, and performance comparison," IEEE Transactions on Broadcasting, vol. 57, No. 2, pp. 165-182, 2011.

Chitti, et al. "Futuristic backhaul networks: Transport protocols perspective," in Proc. IEEE Int. Conf. on Wireless Communications, Vehicular Technology, Information Theory and Aerospace 4 Electronic Systems (VITAE), 2013, pp. 1-5.

Cho, et al., "Integration of SDR and SDN for 5G," IEEE Access, vol. 2, pp. 1196-1204, 2014.

Condoluci, et al., "Toward 5G densenets: archi-tectural advances for effective machine-type communications over femtocells," IEEE Communications Magazine, vol. 53, No. 1, pp. 134-141, Jan. 2015.

Costanzo, et al., "An SDN-based virtual cell framework for enhancing the QoE in TD-LTE pico cells," in Proc. IEEE QoMEX, 2015.

Costa-Requena, et al., "Software defined networks based 5G backhaul architecture," in Proc. ACM Int. Conf. on Ubiquitous Information Management and Communication, 2015, p. 35.

Dao, et al., "Handling real-time video traffic in software-defined radio access networks," in Proc. IEEE ICC, Workshop on Small Cell and 5G Networks (SmallNets), 2015, pp. 191-196.

Dao, et al., "Radio access network coordination framework toward 5G mobile wireless networks," in Proc. IEEE Int. Conf. on Computing, Networking and Communications (ICNC), 2015, pp. 1039-1043.

Das, et al., "Interference-aware power allocation in soft decision fusion (SDF) based cooperative spectrum sensing," in Proc. Annual IEEE India Conference (INDICON), Dec. 2014, pp. 1-6.

De La Oliva, et al., "Xhaul: toward an integrated fronthaul/backhaul architec-ture in 5G networks," IEEE Wireless Communications, vol. 22, No. 5, pp. 32-40, 2015.

Trivisonno, et al., "Virtual links mapping in future SDN-enabled networks," in Proc. IEEE SDN for Future Networks and Services (SDN4FNS), Nov. 2013, pp. 1-5.

Tsai, et al., "Overload control for machine type communications with femtocells," in Proc. IEEE Vehicular Technology Conference (VTC Fall), Sep. 2012, pp. 1-5.

Tsao, et al., "A super-aggregation strategy for multi-homed mobile hosts with heterogeneous wireless interfaces," Wireless Networks, vol. 21, No. 2, pp. 639-658, 2015.

Tseng, et al., "Grouping ID based device trigger mechanism for 3GPP MTC communications," in Proc. International Wireless Communications and Mobile Computing Conference (IWCMC), Aug. 2014, pp. 756-760.

Tsung-Feng, et al., "Adaptive routing for video streaming with QoS support over SDN networks," in Proc. International Conference on Information Networking (ICOIN), Jan. 2015, pp. 318-323.

Tyagi, et al., "Connection establishment in LTE-A networks: Justification of poisson process modeling," IEEE Systems Journal, in print, 2015, p. 2383-2394.

(56) References Cited

OTHER PUBLICATIONS

Tyagi, et al., "Impact of retransmission limit on preamble contention in LTE-Advanced network," IEEE Systems Journal, vol. 9, No. 3, pp. 752-765, 2015.

Ullah, et al., "Fractional frequency reuse for irregu-lar geometry based heterogeneous cellular networks," in Proc. National Symposium on Information Technology: Towards New Smart World (NSITNSW), Feb. 2015, pp. 1-6.

Usman, et al., "A software-defined device-to-device communication architecture for public safety applications in 5G networks," IEEE Access, vol. 3, pp. 1649-1654, 2015.

Valcarenghi, et al. "Experimenting the integration of green optical access and metro networks based on SDN," in Proc. International Conference on Proc. Transparent Optical Networks (ICTON), Jul. 2015, pp. 1-4.

Van der Auwera, et al., "Implications of smoothing on statistical multiplexing of H.264/AVC and SVC video streams," IEEE Transactions on Broadcasting, vol. 55, No. 3, pp. 541-558, 2009.

Van der Auwera, et al., "Traffic and quality characterization of single-layer video streams encoded with the H.264/MPEG-4 advanced video coding standard and scalable video coding extension," IEEE Transactions on Broadcasting, vol. 54, No. 3, pp. 698-718, 2008.

Van der Auwera, et al., "Traffic and quality characterization of the H.264/AVC scalable video coding extension," Advances in Multimedia, vol. 2008, No. 2, pp. 1-27, 2008.

Van der Auwera, et al., "Traffic characteristics of H.264/AVC variable bit rate video," IEEE Communications Magazine, vol. 46, No. 11, pp. 164-174, 2008.

Van der Auwera, et al., "Video texture and motion based modeling of rate variability-distortion (VD) curves," IEEE Transactions on Broadcasting, vol. 53, No. 3, pp. 637-648, 2007.

Wang, et al. "Localized mobility management for SDN-integrated LTE backhaul networks," in Proc. IEEE Vehicular Technology Conference (VTC Spring), May 2015, pp. 1-6.

Wang, et al. "Saving energy in partially deployed software defined networks," IEEE Transactions on Computers, in print, 2016, pp. 1578-1592.

Wang, et al., "AMES-Cloud: a framework of adaptive mobile video streaming and efficient social video sharing in the clouds," IEEE Transactions on Multi-media, vol. 15, No. 4, pp. 811-820, 2013.

Wang, et al., "Backhauling 5G small cells: A radio resource management perspective," IEEE Wireless Communications, vol. 22, No. 5, pp. 41-49, 2015.

Wang, et al., "Cache in the air: exploiting content caching and delivery techniques for 5G systems," IEEE Communications Magazine, vol. 52, No. 2, pp. 131-139, 2014.

Wang, et al. "EstiNet openflow network simulator and emulator," IEEE Communications Magazine, vol. 51, No. 9, pp. 110-117, 2013.

Wang, et al., "Open wireless network architecture in radio access network," in Proc. IEEE Vehicular Technology Conference (VTC Fall), Sep. 2013, pp. 1-5.

Wang, et al., "SDN-based multi-class QoS guarantee in inter-data center communications," IEEE Transactions on Cloud Computing, in print, 2015.

Wei, et al., "DyCaPPON: Dynamic circuit and packet passive optical network," Optical Switching and Networking, vol. 13, pp. 135-147, 2014.

Wu, "Some thoughts on the transformation of information and communication technologies," in Proc. IEEE Technology Time Machine Symposium on Technologies Beyond 2020 (TTM), Jun. 2011, pp. 1-1.

Wu, et al., "Clustering-based time-domain inter-cell interference coordination in dense small cell networks," in Proc. IEEE International Symposium on Personal, Indoor, and Mobile Radio Communication (PIMRC), Sep. 2014, pp. 570-574.

Wu, et al., "Outage performance improvement using relay in device-to-device under-lying cellular networks," in Proc. International Conference on Information Science, Electronics and Electrical Engineering (ISEEE), vol. 1, Apr. 2014, pp. 405-409.

Yaacoub, et al., "On the impact of D2D traffic offloading on energy efficiency in green LTE-A HetNets," Wireless Communications and Mobile Computing, vol. 15, No. 6, pp. 1089-1105, 2015.

Yan, et al., "HiQoS: An SDN-based multipath QoS solution," IEEE Communications, China, vol. 12, No. 5, pp. 123-133, May 2015.

Yeganeh, et al., "Kandoo: a framework for efficient and scalable offloading of control applications," in Proc. ACM Workshop on Hot Topics in Software Defined Networks, 2012, pp. 19-24.

Yuen, et al., "Real time video frames allocation in mobile networks using cooperative pre-fetching," Multimedia Tools and Applications, vol. 32, No. 3, pp. 329-352, 2007.

Zhang, et al., "Interference management for heterogeneous networks with spectral efficiency improvement," IEEE Wireless Communications, vol. 22, No. 2, pp. 101-107, Apr. 2015.

Zhang, et al., "SDN based uniform network architecture for future wireless networks," in Proc. International Conference on Computing, Communication and Networking Technologies (IC-CCNT), Jul. 2014, pp. 1-5.

Zhong, et al., "ColStream: Collaborative streaming of on-demand videos for mobile devices," in Proc. IEEE International Symposium on A World of Wireless, Mobile and Multimedia Networks (WoWMoM), 2014, pp. 1-7.

Zhong, et al., "Issues and challenges in dense WiFi networks," in Proc. International Wireless Communications and Mobile Computing Conference (IWCMC), Aug. 2015, pp. 947-951.

Detti, et al., "Mobile peer-to-peer video streaming over information-centric networks," Computer Networks, vol. 81, pp. 272-288, 2015.

Devasvaran, et al., "Energy efficient protocol in wireless sensor networks using mobile base station," in Procc. IEEE International Symposium on Telecommunication Technologies (ISTT), Nov. 2014, pp. 56-60.

Dias, et al., "Feasibility of video streaming offloading via connection sharing from LTE to WiFi ad hoc networks," in Proc. IEEE International Workshop on Telecommunications (IWT), 2015, pp. 1-6.

DiDonato, et al., "A gender-specific, brochure-based intervention for improving boys' and girls' engineering stereotypes and academic self-perceptions," Global Journal of Engineering Education, vol. 16, No. 1, pp. 34-42, 2014.

Discover Wi-Fi, Passpoint, Transforming the Wi-Fi hotspot experience, 2018. [Online]. Available: http://www.wi-fi.org/discover-wi-fi/wi-fi-certified-passpoint.

Do, et al., "Cooperative spectrum sensing schemes with the interference constraint in cognitive radio networks," in Proc. International Symposium on Computer, Consumer and Control (IS3C), Jun. 2014, pp. 1010-1013.

Dong, et al., "Double auctions for dynamic spectrum allocation," IEEE/ACM Transactions on Networking, in print, 2014.

Draxler, et al., "Dynamic backhaul network configuration in SDN-based cloud RANs," arXiv preprint arXiv:1503.03309, 2015.

Duan, et al., "Partial mobile data offloading with load balancing in heteroge-neous cellular networks using software-defined networking," in Proc. IEEE International Symposium on Personal, Indoor, and Mobile Radio Communication (PIMRC), Sep. 2014, pp. 1348-1353.

Dwarakanathan, et al., "Cloud application HA using SDN to ensure QoS," in Proc. IEEE International Conference on Cloud Computing (CLOUD), Jun. 2015, pp. 1003-1007.

Edemacu, et al., "Resource sharing between M2M and H2H traffic under time-controlled scheduling scheme in LTE networks," in Proc. International Conference on Telecommunication Systems Services and Applications (TSSA), Oct. 2014, pp. 1-6.

Elsawy, et al., "HetNets with cognitive small cells: user offloading and dis-tributed channel access techniques," IEEE Communications Magazine, vol. 51, No. 6, pp. 28-36, Jun. 2013.

Ericsson (Africa), "Building robust signaling networks, meeting the challenges of the rising signalling storm," Jul. 2015. [Online] Available: http://www.ericsson.com/res/docs/whitepapers/wp-building-robust-signaling-networks.pdf.

Faraci, et al., "An analytical model to design and manage a green SDN/NFV CPE node," IEEE Transactions on Network and Service Management, vol. 12, No. 3, pp. 435-450, Sep. 2015.

(56) References Cited

OTHER PUBLICATIONS

Feng, et al., "Device-to-device communications underlaying cellular networks," IEEE Transactions on Communications, vol. 61, No. 8, pp. 3541-3551, Aug. 2013.

Fernandez, et al., "Bandwidth aggregation-aware dynamic QoS negotiation for real-time video streaming in next-generation wireless networks," IEEE Transactions on Multimedia, vol. 11, No. 6, pp. 1082-1093, 2009.

Fitzek et al., "A prefetching protocol for continuous media streaming in wireless environments," IEEE Journal on Selected Areas in Communications, vol. 19, No. 10, pp. 2015-2028, 2001.

Fitzek, et al., "Providing application-level QoS in 3G/4G wireless systems: a comprehensive framework based on multirate CDMA," IEEE Wireless Communications, vol. 9, No. 2, pp. 42-47, 2002.

Flore, 3GPP The Mobile Broadband Standard. 3GPP RAM: Rel012 and beyond. 2014. [Online]. Available: https://www.3gpp.org/news-events/1579-ran_rel12_and_beyond.

Fodor, et al., "Design aspects of network assisted device-to-device communications," IEEE Communications Magazine, vol. 50, No. 3, pp. 170-177, Mar. 2012.

Ghazisaidi, et al. "VMP: A MAC protocol for EPON-based video-dominated FiWi access networks," IEEE Transactions on Broadcasting, vol. 58, No. 3, pp. 440-453, 2012.

Ghimire, et al. "Revisiting scheduling in heterogeneous networks when the backhaul is limited," IEEE Journal on Selected Areas in Communications, vol. 33, No. 10, pp. 2039-2051, 2015.

Giannoulakis, et al., "On the applications of efficient NFV management towards 5G networking," in Proc. IEEE Int. Conf on 5G for Ubiquitous Connectivity (5GU), 2014, pp. 1-5.

Giroire, et al., "Optimizing rule placement in software-defined networks for energy-aware routing," in Proc. IEEE Global Communications Conference (CLOBECOM), Dec. 2014, pp. 2523-2529.

Golrezaei, et al., "Femtocaching and device-to-device collaboration: A new architecture for wireless video distribution," IEEE Communications Magazine, vol. 51, No. 4, pp. 142-149, 2013.

Gorkemli, et al., "QoS control and prioritization with SDN," in Proc. Signal Processing and Communications Applications Conference (SIU), May 2015, pp. 2613-2616.

Gorlatch, et al., "Enabling high-level QoS metrics for interactive online applica-tions using SDN," in Proc. International Conference on Computing, Networking and Communications (ICNC), Feb. 2015, pp. 707-711.

Gotsis, et al., "Evolution of packet scheduling for machine-type communi-cations over LTE: Algorithmic design and performance analysis," in Proc. IEEE Globecom Workshops (GC Wkshps), Dec. 2012, pp. 1620-1625.

Govindarajan, et al., "Realizing the quality of service (QoS) in software-defined networking (SDN) based cloud infrastructure," in Proc. Int. Conf. Information and Communication Technology (ICoICT), May 2014, pp. 505-510.

Miao, et al., "SDN-enabled OPS with QoS guarantee for reconfigurable virtual data center networks," IEEE/OSA Journal of Optical Communications and Networking, vol. 7, No. 7, pp. 634-643, Jul. 2015.

Mohamed, et al., "Control-data separation architecture for cellular radio access networks: A survey and outlook," IEEE Communications Surveys & Tutorials, in print, 2015.

Moon, et al., "Adaptive interface selection over cloud-based split-layer video streaming via multi-wireless networks," Future Generation Computer Systems, in print, 2015.

Moreno, et al., "Optimizing worked-example instruction in electrical engineer-ing: The role of fading and feedback during problem-solving practice," ASEE Journal of Engineering Education, vol. 98, No. 1, pp. 83-92, 2009.

Moreno, et al., "Teaching with concrete and abstract visual representations: Effects on students' problem solving, problem representations, and learning perceptions." APA Journal of Educational Psychology, vol. 103, No. 1, pp. 32-47, 2011.

Moreno, et al., "Using virtual peers to guide visual attention during learning," Journal of Media Psychology, vol. 22, pp. 52-60, 2010.

Nakamura, et al., "Trends in small cell enhancements in LTE advanced," IEEE Communications Magazine, vol. 51, No. 2, pp. 98-105, 2013.

Nam, et al., "Advanced interference management for 5G cellular networks," IEEE Communications Magazine, vol. 52, No. 5, pp. 52-60, May 2014.

Nam, et al., "Energy-aware routing based on power profile of devices in data center networks using sdn," in Proc. International Conference on Electrical Engineering/Electronics, Computer, Telecommunications and Information Technology (ECTI-CON), Jun. 2015, pp. 1-6.

Nikaein, et al. "Simple traffic modeling framework for machine type communication," in Proc. Int. Symposium on Wireless Communication Systems (ISWCS), Aug. 2013, pp. 1-5.

Nunes, et al., "Software-defined-networking-enabled capacity sharing in user-centric networks," IEEE Communications Magazine, vol. 52, No. 9, pp. 28-36, Sep. 2014.

Oh, et al., "Continuous-time collaborative prefetching of continuous media," IEEE Transactions on Broadcasting, vol. 54, No. 1, pp. 36-52, 2008.

Open Networking Foundation, OpenFlow Switch Specification, Version 1.5.0 (Protocol version 0x06), Dec. 19, 2014, ONF TS-020, Available: https://www.opennetworking.org/images/stories/downloads/sdn-resources/onf-specifications/openflow/openflow-switch-v1.5.0.noipr.pdf.

Oracle Communications LTE Diameter Signaling Index, 4th edition, Oct. 2015. [Online] Available: https://www.oracle.com/corporate/pressrelease/oracle-diameter-signaling-index-2015-102115.html.

Osorio, et al., "Comparison of security protocols in mobile wireless environments: tradeoffs between level of security obtained and battery life," in Proc. Workshop of the 1st International Conference on Security and Privacy for Emerging Areas in Communication Networks, Sep. 2005, pp. 275-287.

Ozogul, et al., "Investigating the impact of pedagogical agent gender matching and learner choice on learning outcomes and perceptions," Computers Education, vol. 67, pp. 36-50, 2013.

Ozogul, et al., "Technological literacy learning with cumu-lative and stepwise integration of equations into electrical circuit diagrams," IEEE Transactions on Education, vol. 55, No. 4, pp. 480-487, 2012.

Peng, et al., "A SDN-based energy saving strategy in wireless access networks," IEEE Communications, China, vol. 12, No. 8, pp. 132-145, 2015.

3GPP System Architecture Evolution (SAE); Security architecture, 2015. [Online]. Available: http://www.3gpp.org/DynaReport/33401.htm.

3GPP Specification detail: Evolved Universal Terrestrial Radio Access Network (E-Utran); X2 Application Protocol (X2AP), 2014. [Online] Available: http://www.3gpp.org/dynareport/36423.htm.

3GPP TX 36.331 V12.1.0 (Mar. 2014): 3rd Generation Partnership Project; Technical Specification Group Radio Access Network; Evolved Universal Terrestrial Radio Access (E-UTRA); Radio Resource Control (RRC); Protocol specification (Release 12) "Developments in 3GPP Release 12 and beyond," 2015. [Online]. Available: http://www.3gpp.org/.

Abaid, et al., "Controlling a robotic fish with a smart phone," Mechatronics, vol. 23, No. 5, pp. 491-496, 2013.

Abdelkefi, et al., "K-sparse approximation for traffic histogram dimen-sionality reduction," in Proc. International Conference on Network and Service Management (CNSM) and Workshop on Systems Virtualiztion Management (SVM), Oct. 2012, pp. 64-72.

Abolhasan, et al., "Software-defined wireless networking: centralized, distributed, or hybrid?" IEEE Network, vol. 29, No. 4, pp. 32-38, Jul. 2015.

Abu-Tair, et al., "Upgrading 802.11 deployments: A critical examination of performance," in Proc. IEEE International Conference on Advanced Information Networking and Applications (AINA), Mar. 2015, pp. 844-851.

Adams, et al., "Multiple perspectives on engaging future engineers," ASEE Journal of Engineering Education, vol. 100, No. 1, pp. 48-88, 2011.

(56) References Cited

OTHER PUBLICATIONS

Adegboyega, "An adaptive reservation scheme for effective QoS provisioning in the cloud SDN stack," in Proc. International Conference on Computer Communication and Networks (ICCCN), Aug. 2015, pp. 1-6.
Afaq, et al., "Visualization of elephant flows and QoS provisioning in SDN-based networks," in Proc. Asia-Pacific Network Operations and Management Symposium (APNOMS), Aug. 2015, pp. 444-447.
Ahmad, et al., "Distributed power allocations in heterogeneous networks with dual connec-tivity using backhaul state information," IEEE Trans. Wireless Communications, vol. 14, No. 8, pp. 4574-4581, 2015.
Aiken, et al., Psychological testing and assessment, 12th ed. Allyn & Bacon, 2005.
Aissa, et al., "Overview of machine-type communications traffic patterns," in Proc. World Symposium on Web Applications and Networking (WSWAN), Mar. 2015, pp. 1-7.
Aissioui, et al., "Towards elastic distributed SDN/NFV controller for 5G mobile cloud management systems," IEEE Access, in print, 2015.
Akella, et al., "Quality of service (QoS)-guaranteed network resource allocation via software defined networking (SDN)," in Proc. IEEE International Conference on Dependable, Autonomic and Secure Computing (DASC), Aug. 2014, pp. 7-13.
Al-Dulaimi, et al., "5G communications race: Pursuit of more capacity triggers LTE in unlicensed band," IEEE Vehicular Technology Magazine, vol. 10, No. 1, pp. 43-51, Mar. 2015.
Ali-Ahmad, et al., "An SDN-based network architecture for extremely dense wireless networks," in Proc. IEEE Conf. SDN for Future Networks and Services (SDN4FNS), Nov. 2013, pp. 1-7.
Ameigeiras, et al., "Link-level access cloud architecture design based on SDN for 5G networks," IEEE Network, vol. 29, No. 2, pp. 24-31, Mar. 2015.
Andrews, et al., "Femtocells: Past, present, and future," IEEE Journal on Selected Areas in Communications, vol. 30, No. 3, pp. 497-508, Apr. 2012.
Andrews, et al., "What will 5G be?" IEEE Journal on Selected Areas in Communications, vol. 32, No. 6, pp. 1065-1082, Jun. 2014.
Andrews, et al., "An overview of load balancing in HetNets: Old myths and open problems," IEEE Wireless Communications, vol. 21, No. 2, pp. 18-25, 2014.
Antoniou, et al., "An efficient deadline-credit-based transport scheme for prerecorded semisoft continuous media applications," IEEE/ACM Transactions on Networking, vol. 10, No. 5, pp. 630-643, 2002.
Arslan, et al., "SDoff: A software-defined offloading controller for heterogeneous networks," in Proc. IEEE Wireless Communications and Networking Conference (WCNC), Apr. 2014, pp. 2827-2832.
Asensio, et al., "Carrier SDN to control flexgrid-based inter-datacenter connectivity," in Proc. Int. Conf. on Optical Network Design and Modeling, May 2014, pp. 43-48.
Asvial, et al., "An intelligent load balancing and offloading in 3G WiFi offload network using hybrid and distance vector algorithm," in Proc. IEEE Symposium on Wireless Technology and Applications (ISWTA), Sep. 2014, pp. 36-40.
Auroux, et al., "Dynamic network reconfiguration in wire-less densenets with the CROWD SDN architecture," in Proc. European Conference on Networks and Communications (EuCNC), 2015.
Aurzada, et al. "Capacity and delay analysis of next-generation passive optical networks (NG-PONs)," IEEE Transactions on Communications, vol. 59, No. 5, pp. 1378-1388, 2011.
Aurzada, et al., "FiWi access networks based on next-generation PON and gigabit-class WLAN technologies: A capacity and delay analysis," IEEE/ACM Transactions on Networking, vol. 22, No. 4, pp. 1176-1189, 2014.
Baker, et al., "Application of wireless technology in K-12 STEM outreach programs in middle schools," in Proc. IEEE Antennas and Propagation Society Int. Symposium, 2010, pp. 1-4.
Bakiras, "Maximizing the number of users in an interactive video-on-demand system," IEEE Transactions on Broadcasting, vol. 48, No. 4, pp. 281-292, 2002.

\* cited by examiner

SYSTEMS AND METHODS FOR A LAYERED SDN-BASED BACKHAUL ARCHITECTURE FOR SMALL CELLS

CROSS-REFERENCE TO RELATION APPLICATIONS

This application is a divisional patent application of U.S. patent application Ser. No. 15/780,503; filed May 31, 2018 that is a 371 national patent application of PCT international application No. PCT/US2016/064590; filed Dec. 2, 2016 that claims priority under 35 U.S.C. § 119 to U.S. Provisional Patent Application No. 62/299,905, entitled "SYSTEMS AND METHODS FOR A LAYERED SDN-BASED BACKHAUL ARCHITECTURE FOR SMALL CELLS" and filed on Feb. 25, 2016, which is incorporated by reference in its entirety herein.

FIELD

The present disclosure relates to backhaul architectures and in particular to systems and methods for a layered SDN backhaul architecture for small cells.

BACKGROUND

A plethora of wireless devices running a wide range of applications connect to radio access networks (RANs), as illustrated in FIG. 1. RANs 102 provide end device 110 to radio node (base station) connectivity. The radio nodes 102 are connected to the core networks 104 by technology-specific backhaul access networks 106, such as LTE or WiMax backhaul access networks. Present day hand-held wireless end devices 108 have very high processing and memory capabilities, supporting various applications 110, including resource demanding ones such as live 4K video streaming. Advanced RANs 102, such as LTE-Advanced, support up to several hundred Mb/s in downstream by exploiting a range of physical wireless layer techniques, such as multi-carrier aggregation, opportunistic utilization of unlicensed bands, and millimeter wave technologies. A dense infrastructure of small cells with appropriate interference management is a technique for advanced RANs 102. At the same time, the core networks 104 already employ high-capacity optical links providing abundant transmission capacity.

However, the backhaul access networks 106 have emerged as a critical bottleneck in wireless Internet 112 access. Today's backhaul access networks 106 typically require highly-priced bulky network equipment with proprietary locked-in control software. They also tend to be highly reliable and have high availability. It is therefore often difficult to add new network functionalities, reconfigure operational states, or upgrade hardware as technology advances. These aspects have combined to stifle progress in backhaul access networks 106, causing them to become a critical bottleneck that can stall the progress of wireless networking and undermine the advances in the complementary RANs 102 and core networks 104. It can therefore be concluded that there is a need for innovative approaches, such as a new architecture, to enable technological progress in terms of backhaul access networks 106.

Conventional backhaul access networks 106 include technology-specific functional blocks for the different radio access network (RAN) 102 technologies. For instance, in the LTE architecture, macro cells 202 are served by an LTE Serving-Gateway (S-GW), while pico/femto cells 204 can be served by an Home-eNodeB-Gateway (HeNB-GW)(or S-GW), as illustrated in the bottom left of FIG. 2. RAN 102 and backhaul 106 are thus coupled in conventional wireless networks i.e., a WiMax radio node cannot be used within an LTE architecture. Only with an additional dedicated network entity, an evolved packet data gateway (ePDG), can a WiFi radio node be connected to LTE backhaul with an IPSec tunneling, as illustrated in the bottom middle of FIG. 2.

A study from Nokia Networks indicates that signaling traffic is growing 50% faster than data traffic. The LTE protocol has generally higher signaling overhead compared to legacy protocols. A recent forecast from Oracle Corp. expects a large increase of the global LTE signaling traffic, which is predicted to surpass the total global IP traffic growth by 2019. The increase of signaling traffic can result in service interruptions to customers and financial losses to cellular operators. Therefore, new architectures with simplified signaling mechanisms are necessary to tackle the growth of signaling in the cellular networks.

Signaling in the cellular backhaul is required for a wide range of actions, including initial attach and handovers. Initial attach procedures are completed when a device requests connectivity for the very first time. The initial attach procedure can result in large signaling overhead; however, it is executed only once per connection. Handovers are initiated when a device measures and reports the signal quality to the network upon meeting predefined thresholds. Depending on the configuration, the neighboring cell signal quality along with the quality of serving cell signal may be considered for handover decisions. Handovers require large amounts of signaling in the backhaul and occur very frequently. Especially in ultra-dense networks (UDNs), where the cell range is reduced to relatively small areas on the order of several meters (e.g., 20 meters in femto cells), handovers are very frequent. Even slow movements of devices can cause device moves between multiple cells, resulting in handovers. Hence, especially in UDNs, handovers pose a serious bottleneck in the backhaul entities.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Various embodiments of a backhaul architecture, referred to herein as LayBack architecture, for wireless backhaul access networks based on software defined networking (SDN) are disclosed herein. In contrast to other recently proposed backhaul architectures, such as CROWD, iJOIN, U-WN, Xhaul, and similar architectures, the LayBack architecture consistently decouples the wireless radio access network (RAN) technology (such as LTE or WiFi) from the backhaul access network. In addition, the LayBack architecture flexibly accommodates highly heterogeneous RANs, ranging from sparse cell deployments in rural areas to extremely high cell densities in crowded stadiums. Further, the LayBack architecture is the first architecture to simultaneously support existing cellular access backhaul technologies, such as LTE (4G/3G), WCDMA (3G), and GSM (2G), while providing a new clean-slate platform for cellular backhaul. Previous clean-slate architecture proposals do not support existing cellular backhaul technologies, and hence have limited functionalities. The LayBack architecture also introduces a new network entity, RAN Detection and Assist (RADA), for dynamic wireless node detection and automatic configuration of protocol-specific parameters. RADA enables plug-and-use features for radio nodes (base stations) and innovative interference mitigation.

Proposed LayBack Layered SDN Backhaul Architecture Overview

Figure 1:
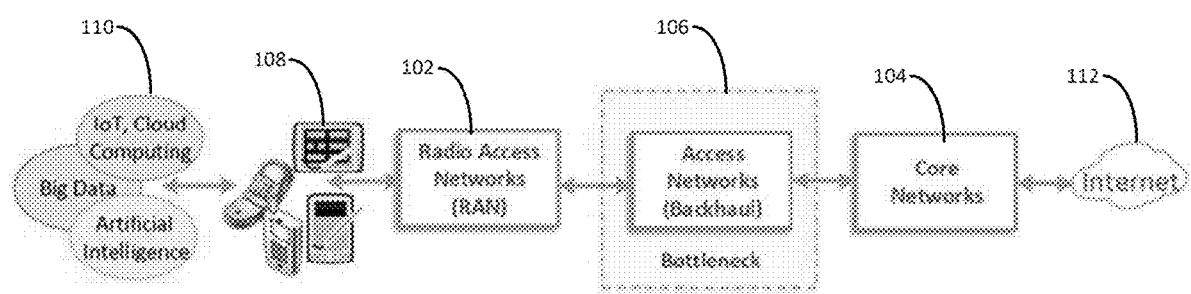
FIG. 1 is a simplified illustration showing a bottleneck in a wireless Internet access chain.
Figure 2:
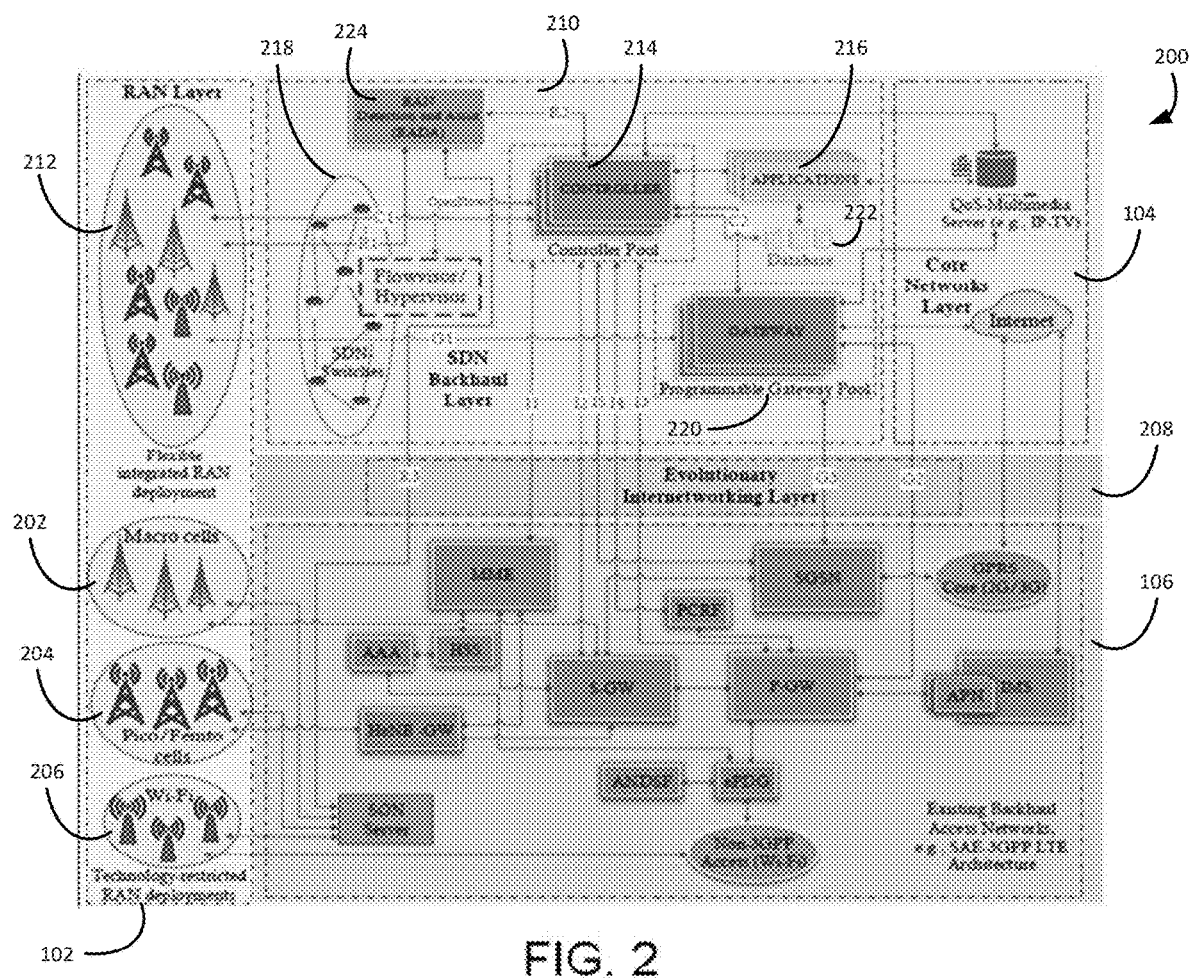
FIG. 2 is a simplified illustration showing one embodiment of a LayBack architecture.

As illustrated in FIG. 2, the LayBack backhaul access network architecture 210 interfaces through an evolutionary internetworking interface 208 with existing backhaul access networks 106, e.g., the SAE-3GPP-LTE architecture. Thus, the LayBack architecture 210 can be layered on top of an existing backhaul access network 106 in an evolutionary manner.

Conventional backhaul access networks include technology-specific functional blocks for the different radio access network (RAN) 102 technologies. For instance, in the LTE architecture, macro cells 202 are served by an LTE Serving-Gateway (S-GW), while pico/femto cells 204 can be served by an Home-eNodeB-Gateway (HeNB-GW) (or S-GW), as illustrated in the bottom left of FIG. 2. RAN 102 and backhaul 106 are thus coupled in conventional wireless networks i.e., a WiMax radio node cannot be used within an LTE architecture. Only with an additional dedicated network entity, such as an evolved packet data gateway (ePDG), can a WiFi radio node be connected to LTE backhaul with an IPSec tunneling, as illustrated in the bottom middle of FIG. 2.

In contrast, the LayBack architecture 210 decouples the RAN 102 from the backhaul 106, as illustrated in the top left of FIG. 2. In the LayBack architecture 210, heterogeneous RAN technologies 212, such as LTE eNBs, pico/femto LTE, WiFi, and even WiMax, can be flexibly deployed and accommodated in the RAN layer 102. The RAN layer 102 interacts with the LayBack backhaul 210 through a network of flexible SDN (OpenFlow, OF) switches and onwards through a gateway pool to the Internet (core networks 104). The data plane of the LayBack backhaul network 210 includes the network of SDN switches and the gateway pool. This data plane is centrally controlled by an SDN controller pool (LayBack controller 214) and the applications 216 (with corresponding databases).

Outline of Layers in LayBack Architecture

The key components and functionalities of the LayBack architecture 210 will be discussed in greater detail below as well as contrast the LayBack architecture from previous designs.

Radio Access Network (RAN) Layer

Mobile wireless end devices 108 are heterogeneous and have a wide range of requirements. Providing reasonable quality-oriented services to every device on the network is a key challenge to the wireless network design. The LayBack architecture 210 takes a unique approach to provide requirement-specific network connectivity to every device 108 that is connected to the LayBack network. The LayBack architecture 210 is designed to be adaptive to the different environments, such as an airport terminal, public park, or university/school. Thus, enabling the LayBack architecture 210 to support the wide range of device requirements, such as real-time D2D video streaming at a large sporting event or music concert as well as augmented reality on a mobile device for school classroom teaching. Therefore, to examine the wide range of key applications supported by LayBack architecture 210, project video streaming as well as device-to-device (D2D) and massive machine type communication (MMTC) are discussed which can support emerging applications, such as the Internet of Things, BigData, and cloud computing.

Radio nodes, such as the evolved NodeB (eNB) in LTE or an access point in WiFi, provide radio access network (RAN) services to the end devices 108. Aside from LTE and WiFi, there exists a wide range of wireless access technologies (and protocols), including Wi-MAX, Zig-Bee, Bluetooth, and near field communication (NFC). These wireless protocols have unique advantages and serve unique purposes; therefore, a fluidly flexible radio node that seamlessly supports a diverse range of wireless protocols is desired. However, a backhaul to homogeneously support such a fluid radio node, or equivalently multiple different types of radio nodes, does not yet exist. Therefore, the LayBack architecture 210 is fundamentally designed to work with multiple RAN and communication technologies by isolating the RAN layer 102 from the backhaul network 106.

In existing backhaul access networks, a given RAN technology requires a corresponding specific backhaul. For instance, the LTE radio access network can only operate with LTE backhaul network entities. This restriction of specific RAN technologies to specific backhaul technologies limits the usage of other radio access technologies on LTE backhaul networks and vice-versa. In addition, femto cells 204 are expected to operate on multiple RAN technologies. To address this restrictive structure of present RAN-backhaul inter-networking, the LayBack architecture 210 flexibly supports multiple types of radio nodes, including software defined radios integrated with SDN enabled radio nodes.

SDN Backhaul Layer

The SDN backhaul layer 210 encompasses the SDN switches 218 (with hypervisor), controller pool 214, and gateway pool 220, as well as the applications 216 and data bases 222.

SDN (OpenFlow) capable switches 218 are today typically based on the OpenFlow (OF) protocol and are therefore sometimes referred to as OpenFlow switches or OF switches. This proposal is presented in the context of OpenFlow switches 218, but emphasize that the proposed LayBack architecture 210 applies to any type of SDN-capable switch. OF-switches 218 are capable of a wide range of functions, such as forwarding a packet to any port, duplicating a packet on multiple ports, modifying the content inside a packet, or dropping the packet. The switches 218 can be connected in a mesh to allow disjoint flow paths for load balancing.

The LayBack controller 214 configures the entire OF-switch fabric 218 (network of OF switches) by adding flow table entries on every switch. The LayBack controller 214 is also able to dynamically configure and program the gateway pool 220 functions, such as queuing policies, caching, buffering, charging, as well as QoS and IP assignment for the end devices. The LayBack controller 214 coordinates with existing (legacy) cellular network entities, such as the mobility management entity (MME) and the authentication, authorization, and accounting (AAA) server as well as other 3GPP entities, to coexist with present architectures. Connections from the LayBack controller 214 to the 3GPP entities can be provided by extending the existing tunneling interfaces at the 3GPP entities. Extensions of the tunneling interfaces will be defined as a part of the evolutionary internetworking layer illustrated in FIG. 2. Thus, the LayBack architecture 210 can enable communication between the new flexible RAN architecture 212 in the top left of FIG. 2 as well as legacy technology-specific RAN 202-206 and backhaul networks 106 shown in the bottom of FIG. 2.

Applications 216 are the programs that are executed by the controller 214 for delegating instructions to individual SDN-Switches 208. The controller applications 214 realize all the network functions required for Internet connectivity, such as authentication and policy enforcement, through the switch flows. Radio nodes utilize RAN-specific interfaces for their operation (e.g., the X2 interface in LTE) and these interfaces may be realized through controller applications 216 on the network of SDN-switches 208. Therefore, for LTE in LayBack, eNBs may be enabled with inter-radio node X2 interfaces along with other required interfaces. Cellular networks have many network functions, such as the Automatic Network Discovery and Selection Function (ANDSF) of 3GPP. As an example, to replace ANDSF in the LayBack architecture 210, a dedicated controller application 216 may be responsible for delegating network access policies to the devices.

LayBack Interface Definitions

All LayBack interfaces may be logical entities within which a cellular operator has the freedom to select an arbitrary protocol, such as DIAMETER and RADIUS, for its deployments to establish the connectivity between the network entities. However, to enable the communication between the two entities, a TCP connection may be sufficient and facilitate the exchange of information among the network entities. In the following subsections we define the LayBack interfaces are defined which are enumerated within the LayBack architecture in FIG. 2.

R1 and R2 Interfaces: RADA to Radio Node and SDN Controller

A radio node, which may be comprised of multiple radio access technologies, such as LTE and Wi-Fi, when connected to the LayBack architecture 210 may be first identified. The identification process involves a broadcast of information from the radio node which contains its capabilities (e.g., RAN supported, etc.) and functionalities (e.g., bands supported for carrier aggregation, etc.). RADA 224 may be a server (similar to a dynamic host configuration protocol (DHCP) server of the Internet) which listens to broadcast messages from the radio nodes. Upon reception of a broadcast message, 1) RADA 224 notifies the SDN LayBack controller 214 of the RATs supported by the radio node, and 2) assigns a configuration (e.g., cell id, protocol specific parameters present in the MIB, SIBS, RRC configurations of LTE, etc.) to the radio node (possibly with assistance from the SON servers of LTE). For instance, if the RADA 224 detects an LTE radio node requesting the backhaul connectivity, then the SDN-controller 214 configures the entire LayBack architecture 210 (i.e., the SDN-controller itself, as well as the switches 218 and gateways 220) to appear as LTE backhaul entities to the requesting radio node. Gateways 220 are programmed to function as S/P-gateways, LTE tunnel interfaces, such as X2, S1, and S5 within the SDN framework, are established and the SDN controller 214 appears as an MME to the radio node. Upon the successful completion of the connectivity, the radio node maintains an active connection with RADA 224 for the advance operations supported by the LayBack architecture 210, such as holistic interference management and dynamic resource wireless allocation (e.g., permission to use large wireless bandwidth and large gateway resources to accommodate a surge of large number of users). The R1 interface is created to establish the communication between the radio node and the RADA 224. Similarly, the R2 interface facilitates the communication between RADA 224 and the SDN controller 214.

R3 Interface: RADA to SON Server of LTE

The R3 internetworking interface establishes communication between RADA 224 and the SON servers of LTE. The LayBack architecture 210 has been designed to co-exist and make use of available resources within the existing LTE deployments. SON servers can share their algorithms with RADA 224 to dynamically configure a large number of LTE protocol-specific parameters, such as parameters related to cell selection, handover, and reselections. The R3 interface can be used to enable the cross-interference mitigation between the radio nodes of the LayBack architecture 210 and the radio nodes within existing LTE deployments supported by SON.

G1 Interface: Radio Node to Gateway

The LayBack Gateway 220 is a network entity which can be deployed in parallel or as a pool of infrastructures. However, a pool of gateways 220 appears as one logical entity for any given micro-architecture to reduce the signaling within the LayBack architecture 210, unlike in LTE where multiple gateways exist. Gateway 220 functions are programmed by the SDN controller 214 and can be implemented via configurable network function virtualization (NFV). Regardless of the implementation, the gateway 220 dynamically enables and reconfigures multiple network functionalities to establish and support simultaneous connectivity to heterogeneous RANs 212, such as LTE, Wi-Fi, and Wi-Max. For example, the gateway 220 in the LayBack architecture 210 can function as both S/P-GW for an LTE radio node and the same gateway can appear as a simple Internet Gateway for a Wi-Fi radio node, Within the context of the LayBack architecture 210, the G1 interface is established to transport the data plane traffic from the radio node to the gateway 220. The G1 interface can inherit the properties of the S1-U interface for the operation of the LTE radio node in the LayBack architecture 210. However, the LayBack architecture 210 exploits the traffic duplication property of SDN to forward the traffic between multiple network entities during handovers, thus avoiding the signaling overhead of the DIAMETER and RADIUS protocols.

G2 Interface: Gateway to P-GW

The G2 interface establishes connectivity between the LayBack gateway 220 and the P-GW of the existing LTE deployments. All the traffic exchanges as well as human-to-human and device-to-device communications between the LayBack architecture 210 and present LTE deployments are facilitated by the G2 interface. The G2 interface can also be used for facilitating the handovers between the LayBack architecture 210 and present LTE deployments. During the handover process, the LayBack gateway 220 shares the bearer context of the device with the P-GW of LTE and vice versa. Traffic is then forwarded between the LayBack gateway 220 and the P-GW via the G2 interface to ensure the continuous flow of traffic to the device during the handover procedures.

G3 Interface: Gateway to SGSN of Legacy 3G/2G

Enabling the connectivity to legacy cellular communications technologies, such as WCDMA and GSM, is an important aspect of future backhaul architectures. While voice over LTE (VoLTE) is still an emerging technology within LTE deployments, circuit switched fall-back (CSFB) to legacy technologies, such as GSM (2G) and WCDMA (3G), are still popular choices for enabling voice communication in LTE deployments. CSFB is supported through redirection and handover procedures to legacy technologies. Additionally, there can be Inter-RAT data handovers between LTE in LayBack and legacy technologies. To enable these functionalities within the LayBack architecture 210, the G3 interface facilitates all the communications (usually for data traffic forwarding) between the LayBack gateway and the Serving GPRS Support Node (SGSN) of legacy 3G systems.

CI Interface: SDN Controller to Radio Node

RADA 224 assigns IP addresses to the radio nodes and provides the necessary information regarding the SDN controller 214 and the gateway 220 (e.g., IP address of the gateway and controller) to a newly connected radio node. The radio node can then establish connections with SDN controller 214 and the gateway 220. The SDN controller 214 can change the IP address of the radio node at later stage in coordination with the gateway 220, if required. All the communication between the SDN controller 214 and the radio node is facilitated by the CI interface.

C2 Interface: SDN Controller to Gateway

The LayBack gateway 220 is programmed by the SDN controller 214 for realizing the gateway functions specific to the radio nodes. The SDN controller 214 dynamically configures the gateway 220 to create and modify bearer contexts of the devices and resource allocation to the radio nodes. Gateways 220 can be enabled to report the network utilization and other statistics, such as session duration, to SDN controllers 214 for policy enforcement. All the communications between the SDN controller 214 and the gateway 220 are enabled through the C2 interface.

I1-I5 Interface: SDN Controller to MME, S-GW, P-GW, PCRF of LTE, and SGSN Legacy 3G/2G The Interfaces connecting the entities of the LayBack architecture 210 to the existing deployments of LTE and legacy 3G/2G are defined as the internetworking I interfaces, ranging from I1 to I5. The MME controls all the mobility functionalities in the LTE backhaul. During the LayBack to LTE handover, the SDN controller 214 notifies the MME of the TeNB through the interface I1. The MME then coordinates the new bearer set-up on the P-GW via the interface I3 for the device arriving at the TeNB. The traffic is then forwarded via the interface I2 from the SeNB of the LayBack architecture 210 to the S-GW of the LTE to which TeNB is connected. Once the handover occurs, the tracking and policy enforcement is conducted in coordination with the LayBack SDN controller 214 and the PCRF of LTE via the interface I4. The handover from the LTE backhaul to LayBack can be similarly extended by using the I interfaces. Internetworking between LayBack and 3G/2G backhaul, and vice versa can be enabled by the communication (usually to exchange control messages) between the LayBack SDN controller 214 and the SGSN via interface I5. In contrast, data forwarding between the LayBack gateway 220 and the SGSN can be accomplished over interface G3.

LayBack Hierarchical Micro-Architectures

A micro-architecture hierarchy consists of a global (root) controller and multiple environment-specific local controllers located in the respective environments. The local controllers can tailor applications for the different environments, e.g., a park with a sparse user population or a stadium with a very high user density. Accordingly, the micro-architectures classify applications specific to an environment as local applications and more common applications as global applications. For example, WiFi offloading and adaptive video streaming can be considered as local applications, whereas applications that serve a larger purpose, such as interference management, can be considered as global applications. Throughout this project, heterogeneous environments with a micro-architecture are considered in the various proposed studies and evaluations.

Video QoS Networking

Problem Motivation

SDN support strategies for QoS for general network traffic have been widely studied. Similarly, general strategies for exploiting multiple wireless RAN technologies have been explored for general network traffic, in particular, LTE can be combined with enhanced forms of WiFi. However, very little research to date has addressed the specific characteristics of multimedia transmission. Video traffic in particular is projected to account for a large portion of the access network traffic load. Only very limited research has been conducted to date on video streaming over backhaul networks and RANs. Specifically, proactive video caching in 5G small cells and femto cells have been studied. Traffic engineering for coordinating the CBR vs. VBR video interference explored. Based on seminal work on video streaming over multiple transport paths, a few recent studies have begun to explore the general feasibility of combining LTE and WiFi for video streaming. Several prior approaches have explored collaborations among multiple wireless devices to deliver video to a given device.

While these prior approaches consider the timeliness of the distinct wireless transmission paths for scheduling an individual video flow, they do not consider the specific video frame sizes and play-out deadlines across a multitude of video flows. Neither do the existing approaches consider the playback buffer contents across a community of served video clients for video frame scheduling.

LayBack Collaborative Micro-Architecture Video Streaming

Collaborative video streaming mechanisms have been developed within the micro-architecture framework of the LayBack architecture 210. For densely populated areas, e.g., airport terminals and stadiums, it is highly likely that multiple RAN technologies 212, e.g., LTE and WiFi, are deployed, and multiple simultaneous (unicast) video streams are being transmitted to (or from) devices within the coverage area of the considered micro-architecture, which is controlled by a local controller.

For the sake of outlining the proposed streaming mechanism, the focus will be on the streaming of pre-recorded video from multimedia servers to the community of end devices (streaming from end devices and live video streaming will be examined as extensions). The principles of scheduling the earliest transport path are combined with the principle of collaborative video scheduling to form a novel collaborative video streaming mechanism across heterogeneous RAN technologies. The various radio nodes (e.g., LTE eNBs and WiFi access points) within the coverage area of the local micro-architecture controller report their wireless channel conditions to the individual video stream consuming end devices to the local controller. The local controller runs a streaming application, which can utilize the aid from scalability techniques. The controller streaming application tracks the video playback buffer contents of the end devices.

Combining the knowledge of the video playback buffer contents and the wireless path conditions across the various radio nodes, the streaming application schedules the next video frame for the device with the shortest (in terms of video playback duration) buffer content and reasonably good transmission conditions over at least one RAN. A range of specific video frame scheduling policies are examined for the efficient variable bit rate (VBR) video encodings. Utility function approaches will be investigated that trade off the wireless transmission conditions to the individual video consuming end devices with the playback duration of the video segments buffered in the end devices and the sizes of the upcoming (next to be transmitted video frames). Depending on the outcomes of the scheduling based on the frame sizes, the frame type will be considered and corresponding contribution to improving the video quality (reducing the video distortion) in the scheduling.

Interference Mitigation
Problem Motivation

Interference is one of the main limitations for the deployment of small cells. Effective interference mitigation is critical for reaping the capacity increases promised by ultra-dense small cell networks. Generally, macro cells and small cells use the same frequency for transmissions and need coordination to adapt power dynamically and to share resources in time using the coordinated multipoint (CoMP) technique. In the existing CoMP technique, radio nodes coordinate transmissions with almost blank sub-frames (ABSs) and non-ABSs to share the resources in time. Radio nodes communicate with each other via the X2 interface to dynamically configure the resources. However, as more small cells are deployed, more physical layer resources have to be spared for ABS sub-frames, lowering throughput.

Advanced wireless protocols can be used to mitigate the interference between interfering cells. However, the existing interference mitigation techniques have significant drawbacks: 1) large backhaul control traffic to coordinate transmission, and 2) throughput degradation due to sharing the physical (e.g., time, frequency, and space) resources. For instance, coordination between small cells for interference mitigation can employ cognitive techniques or spectrum sensing, spectrum auctioning, and other techniques with intense wireless interactions requiring extensive physical resources.

Proposed RADA Entity and Interference Mitigation
Overall Strategy: Centralized Resource Allocation to Radio Nodes The present disclosure centralizes the interference management techniques to uniquely address the physical layer over-head and ease of protocol management. Generally, network based interference coordination technique are based on, 1) spatial-domain resource partitioning, 2) time-domain resource partitioning, and 3) frequency-domain resource partitioning. In present LTE deployments, the assignment of an interference coordination technique from the network to a radio node is static, limiting the resource utilization and the radio nodes may frequently have to communicate with each other to coordinate the non-colliding wireless transmissions. Through a centralized decision entity, the inter-radio node communication can not only be reduced, but also creates a global platform for implementing new interference management techniques. The strategy is to centrally control (with a global holistic perspective) the long-term wireless configurations, such as center frequency, bandwidth, and time-sharing pattern (ABS configuration in LTE), as well as protocol-specific configurations (e.g., random access channel parameters in LTE). The long-term wireless configurations can be highly adaptive according to environmental events, such as boot-up and migrations of end devices that change device densities at radio nodes.

Through the proposed RAN Detection and Assist (RADA) entity, resources (center-frequency, bandwidth, and duration) are dynamically allocated to radio nodes (base stations) based on events, so as to improve the utilization and to coordinate interference. For example, if a radio node has only few devices, then it does not require much bandwidth. The presently employed static bandwidth assignment techniques thus waste resources. On the other hand, if a neighbor radio node has a large number of devices it will exhaust its resources, leading to starvation. To the best of our knowledge, there exists no mechanism yet for flexible resource allocation to the radio nodes. LayBack addresses these issues with RADA. RADA is a flexible clean-slate solution that can serve as a platform for new interference mitigation mechanisms.

Outline of Proposed RADA Entity and Operation

Figure 3:
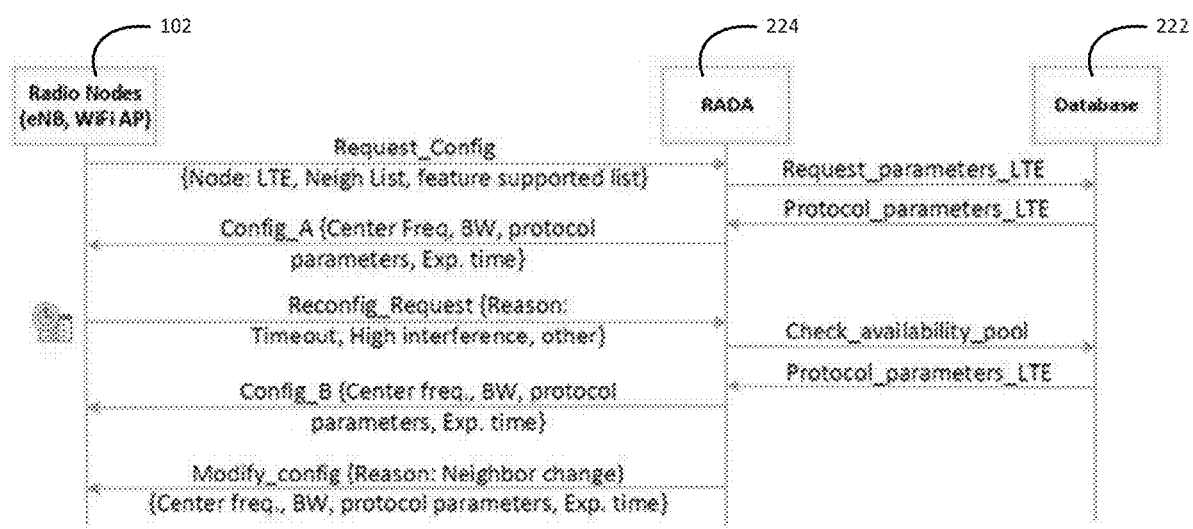
FIG. 3 is a simplified illustration showing an interference coordination through a Radio Access Network Detection and Assist (RADA)

A novel network entity, namely the RAN Detection and Assist (RADA) entity 224, is introduced within the LayBack architecture 210 to coordinate and assist the RAN 102 with wireless protocol configurations. RADA 224 dynamically assigns and modifies wireless protocol configurations based on events. The interference coordination protocol mechanisms executed by the proposed RADA 224 is illustrated in FIG. 3. Radio nodes 102, such as an eNB of LTE or a WiFi AP, are connected with a plug-in feature into the backhaul. On boot-up, a radio node 102 requests configuration information through RADA 224. An intelligent configuration scheduler application in RADA 224 will allocate the configuration parameters for the radio node's operation. Every configuration will have a timeout; upon expiration of the current configuration, the radio node 102 will have to request reconfiguration. RADA 224 can also send modify-configuration requests to radio nodes. In order to inter-work with the existing LTE backhaul networks, RADA 224 is connected to SON servers 218 of LTE, as illustrated in FIG. 2.

The outlined novel assignment of configurations to radio nodes 102 is akin to the configuration of devices by the eNB in LTE. For example, LTE assigns physical resources, such as frequencies and bandwidths to devices. We replicate this behavior at the level of radio nodes (eNBs), i.e., we let RADA 224 configure eNBs, similar to the way an eNB configures devices in LTE.

Interference Mitigation Across RAN Technologies

The proposed RADA-based interference mitigation significantly advances the state-of-the-art in interference mitigation, including interference mitigation with SDN-based techniques. Existing techniques are limited through their tight coupling (integration) between RAN technology and corresponding interference control and backhaul. For instance, the techniques consider an SDN controller 214 platform to address the interference in a specific RAN technology. Generally, the existing techniques independently mitigate interference for each given RAN technology. However, distinct RAN technologies increasingly share the same frequencies, e.g., LTE small cells may operate in the same frequency bands as WiFi.

Through the decoupling (layering) of RAN and backhaul, as illustrated in the top part of FIG. 2, the LayBack architecture 210 for the first time permits a holistic interference management. The LayBack architecture 210 decouples backhaul networks 106 with wireless protocol operation allowing RADA 224 to assist the radio nodes.

Resource Configuration (Assignment) Mechanisms

The present disclosure investigates hybrid methods of network-based resource configuration (assignment) in the time, frequency, and spatial domains for interference mitigation. RADA 224 gives high degrees of freedom to achieve flexible configurations across heterogeneous RAN deployments. The configuration scheduler will consider several environmental and traffic factors, including the number of devices at a radio node, QoS requirements, and radio node neighbor densities of a given radio node.

The assignment of high-level configurations to radio nodes is an entirely novel approach. The closest existing approach is that of self-organizing networks (SONs). SONs assign some protocol-specific operation parameters. The RADA 224 approach is fundamentally different from the SON approach in that RADA can exploit the SDN-based backhaul 106 paradigm. Our RADA 224 approach is complementary to SON and can cooperate with and enhance existing SON functionalities, as indicated through the connection of the SON server to RADA 224 in FIG. 2. RADA 224 interacts with both the SDN controller pool 214 in the LayBack architecture 210 and the SON server in legacy LTE networks to exploit global knowledge across the RAN and the backhaul network. In contrast, a conventional SON server in a legacy LTE backhaul network 106 is unaware of the conditions in the backhaul network.

As an example use case, a radio node 102 can 1) request higher bandwidth when there many users, 2) request a change of the frequency bands due to a conflict with a radio node neighbor, and 3) indicate to RADA 224 high sensed interference levels and request adjustments of the neighbor radio node. In all cases, RADA 224 makes decisions based on the global perspective. Through the centralized RADA 224 approach, the need for inter-radio node communication for interference mitigation between all the neighbor cells is eliminated. It is acknowledged that inter-node communication is still needed for other applications, such as device handover. However, interference mitigation becomes especially critical for dense small cell RANs with a large number of neighboring radio nodes. LayBack and RADA should significantly lower the control overhead in such small cell networks.

Connecting a billion devices to the Internet will significantly increase the power requirements of the network. General energy efficiency strategies, such as radio node wake up and sleep strategies, as well as SDN-based power efficient algorithms can be employed in the LayBack architecture 210. Specifically, the present disclosure evaluates how our RADA LayBack can enhance energy efficiency strategies. Lay-Back is aware of the radio resource allocations and can exploit this knowledge for enhancing network level power efficiency. Power consumption statistics at each radio node can be used at the LayBack controller to configure backhaul so as to reduce the total energy cost per connection.

Device-to-Device and Massive Machine Type Communication

Problem Motivation

Device-to-device (D2D) Communication

Device-to-Device (D2D) communication will play an important role in the future of real-time content sharing. D2D communication has been categorized into two different forms: local and global D2D communication. In local D2D, the device is responsible for coordinating and communicating with other devices. In contrast, in global D2D, referred to as network-assisted D2D, the RAN/eNB acts as the anchor point for traffic flows between the devices. That is, in network-assisted global D2D, the network performs the coordination for the devices and establishes connections between the devices. Communication paths for global D2D between devices may involve the S-GW and even the P-GW in LTE. However, global D2D communication provides distinctive advantages over local D2D communications. Global D2D has: 1) longer range; 2) higher power inefficiency as the distance between devices is increased; and 3) higher reliability.

In ultra-dense network deployments, it is reasonable to assume that devices are near small-cell base stations (eNBs), making global D2D communication viable. Therefore, the present disclosure focuses on providing efficient global D2D platform in the LayBack architecture 210. Prior SDN-based D2D communications studies have mainly focused on local D2D communication and not examined the backhaul implications of D2D communication in cellular networks in detail. In contrast, the present disclosure focuses closely on the coexistence of global D2D communication with regular background traffic and enforces QoS for the D2D links along with regular traffic directed to the Internet core.

Massive Machine Type Communication (MMTC)

Machine type communication (MTC) is a common type of communication in Internet of Things applications. Trillions of MTC capable wireless devices are anticipated in 5G networks for IoT applications, thus creating the phenomenon of massive machine type of communications (MMTC). MMTC can cause an immense overload on the RAN and the backhaul network; therefore, requiring architectural advances specific to MTC. Several overload-control mechanisms with a focus only on the RAN have been proposed to address the overload problem due to MMTC.

In conventional LTE, every device has to establish bearers (device-specific traffic channels) with the S-GW and P-GW. Bearer management becomes very complex at the S-GW/P-GW for MTC due to the high number of devices. Several methods have been proposed to address the bearer management problem, such as virtual bearer management, grouping, context-aware backhaul management, and network overload solutions for 3GPP systems.

However, the proposed methods are limited and localized to gateways and do not consider traffic management and typically require large amounts of signaling (at the higher layers, between MTC server and gateways). Therefore, backhaul access networks will very likely become a main bottleneck in large scale deployments for massive densities of communicating machines. In the LayBack architecture, a context swapping algorithm is proposed to exploit SDN-switch capabilities to synchronize traffic to be roughly periodic and efficiently manage gateway resources by minimizing control overheard.

Proposed Protocol Mechanisms

Global D2D Communication

Figure 4:
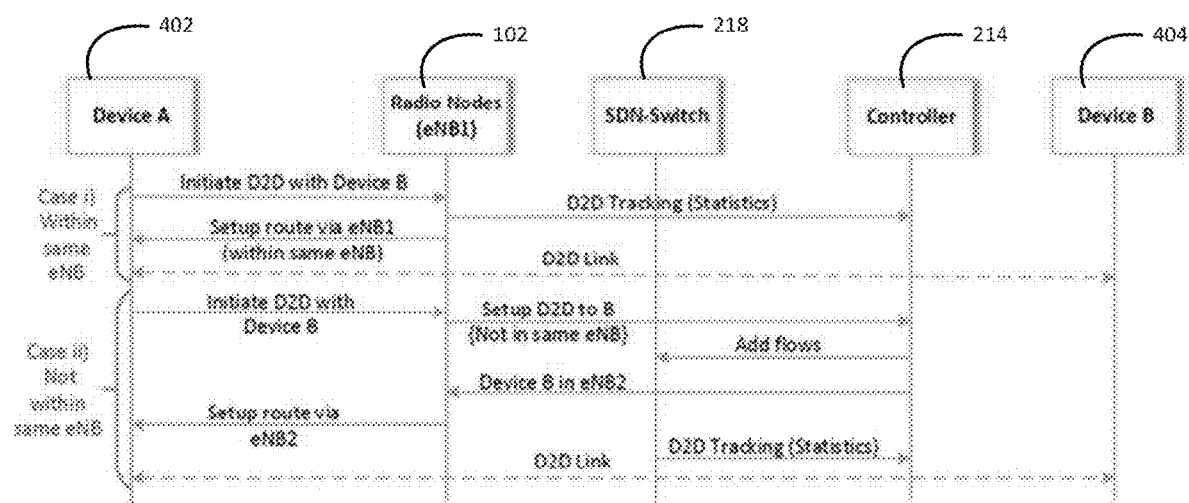
FIG. 4 is a simplified illustration showing a global D2D protocol mechanism.
Figure 5:
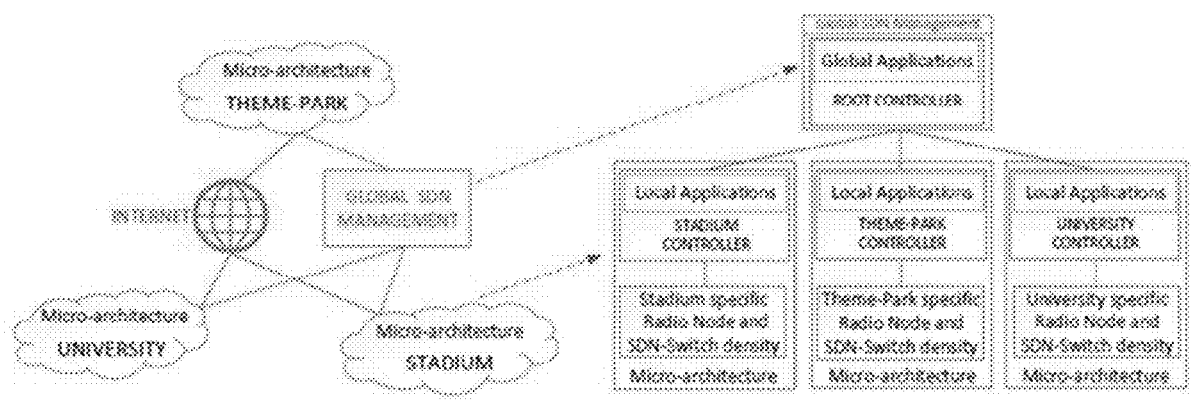
FIG. 5 is a simplified illustration of an environment-specific micro-architectures and controller hierarchy.

The present disclosure examines global D2D communication mechanisms within the LayBack architecture 210. The global D2D communication mechanism strives to avoid flooding on the access network, to improve power efficiency of the device, and to provide simple transparent D2D communication. FIG. 4 illustrates an elementary protocol mechanism for global D2D communication. Device A 402 sends a request for connection establishment with Device B 404 to the radio node 102 in the vicinity of Device A. The two devices can be located: i) in the same cell, or ii) in distinct cells. The radio node 102 (e.g., eNB) checks with the SDN controller 214, which maintains a subscriber (location) data base. Based on the locations of the two devices, the radio node 102 will send the routing information to Device A 402 to reach Device B 404. Routes will be allocated at the SDN-switch 218 level, thus preventing the D2D traffic from entering the gateway and core networks for routing. The SDN controller 214 will maintain the information of all the devices attached to LayBack architecture 210 and thus control the routing. In every case, SDN controller 214 will receive traffic statistics to monitor the D2D connections.

MMTC Communication

Irrespective of the pay load traffic volume (low or high), SDN-switches 218 can be limited by the number of active flows (e.g., due to limited flow table size). High numbers of machine connection attempts to the network can cause: 1) flow table exhaustion at the switches (when no tunneling is used), and 2) denial of service by the gateway. MMTC densities are estimated to exceed 30,000 machines (devices) per cell. These ultra-dense-type network deployments present an important management challenge for the backhaul network. A machine context swapping technique is executed by the LayBack controller 214 and the gateway 220.

Radio nodes 102 typically use fixed-grant scheduling for allocating physical layer resources to devices for MTC in IoT environments, i.e., a device can only send data during a specific short time slot that is periodically recurring (e.g., every 2 or 10 s). Thus, MTC traffic has typically a periodic traffic pattern from the radio node to the gateway 220. The present disclosure exploits this periodicity of the MTC traffic in the LayBack architecture 210. Periodic traffic traversals across SDN switches 218 may not require flow entries to persist on the SDN switches all the time. Suppose that the period of an MTC traffic flow is 2 seconds. Then, the LayBack controller 214 can periodically and pro-actively configure the switches 218 (i.e., without a PacketIn event at the controller) every 2 seconds, reducing the control plane overhead.

However, the collection of periodic traffic (resulting from large number of devices) at the radio node, may not be periodic. Therefore, statistical modeling is required to synchronize the flows belonging to a single group to be roughly periodic. Statistical modeling at the LayBack controller 214 can be assisted in two ways: 1) Radio nodes 102 inform the LayBack controller 214 about the fixed grant scheduling to predict the traffic, and 2) Histogram analysis can be used to estimate the period and other traffic characteristics, such as the standard deviation of the period duration. The estimates can be used to set up the flow and timeout entries. The present disclosure employs clustering and grouping of the periodic flows to batch process the swapping of flows.

The LayBack architecture 210 employs three steps to address the overload problem: 1) synchronize the traffic at the SDN switches, 2) group the flows based on periodicity duration, and 3) set minimized timeouts for MTC flows at the SDN switches. These steps facilitate the prediction of the MTC traffic timing at the gateway. Exploiting the behavior of predictable traffic, we propose a novel context-swapping (CS) algorithm at the gateway pool and the LayBack controller 214. The CS algorithm at the controller selects the flow group at the SDN switch 218 and the corresponding gateway 220 flow contexts (e.g., bearer context, tunneling information if being used, and port numbers) to be temporarily saved. The CS algorithm decides on the swapping action based on the flow statistics reported by the switches 218 and the gateway 220 utilization function. Upon saving the context, resources can be freed up at the SDN switches 218 and the gateway pool 220 to accommodate new MTC flows. Context resources of a group will not overlap in time with other groups, thus isolating MTC flow groups, making them independent of each other. Therefore, the proposed CS technique enables the efficient management and utilization of the gateway and SDN switch resources.

Intra-LayBack Handover: A Radically Simplified Handover Protocol

Motivation: Signaling Load Due to Frequent Handovers

The LTE protocol has generally higher signaling overhead compared to legacy 3G protocols. A recent forecast from Oracle Corp. expects a large increase of the global LTE signaling traffic, which is predicted to surpass the total global IP traffic growth by 2019. The increase of signaling traffic can result in service interruptions to customers and financial losses to cellular operators. Therefore, new architectures with simplified signaling mechanisms are necessary to tackle the growth of signaling in the cellular networks.

Signaling in the cellular backhaul is required for a wide range of actions, including initial attach and handovers. Initial attach procedures are completed only when a device requests connectivity for the very first time. The initial attach procedure can result in large signaling overhead; however, it is executed only once. Handovers are initiated when a device measures and reports poor signal quality to the network. Depending on the configuration, the neighboring cell signal quality along with the quality of serving cell signal may be considered for handover decisions. Handovers require large amounts of signaling in the backhaul and occur very frequently. Especially in ultra-dense-type networks (UDNs), where the cell range is reduced to relatively small areas on the order of several meters (e.g., 20 m in femto cells), handovers are very frequent. Even slow movements of devices can cause device moves between multiple cells, resulting in handovers. Hence, especially in UDNs, handovers are the source of serious bottlenecks in the backhaul entities.

Proposed 4-Step Intra-LayBack Handover

Figure 6:
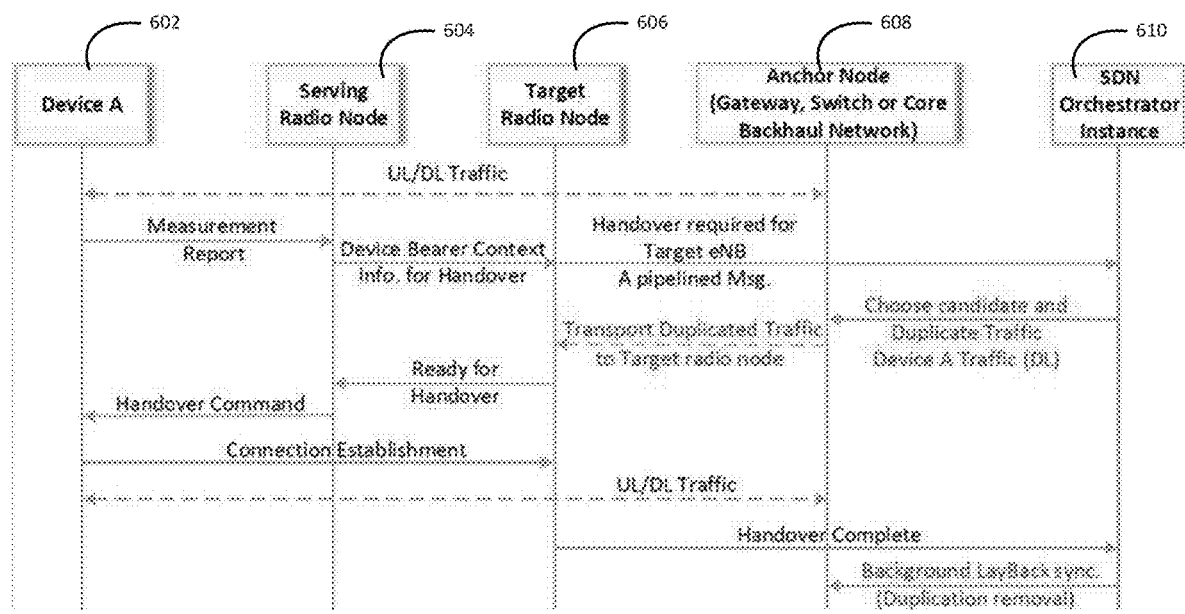
FIG. 6 is a simplified illustration showing a simplified intra-LayBack handover in SDN-LayBack architecture.

The LayBack handover is the first mechanism to exploit SDN traffic duplication to simplify the handover procedure in cellular backhaul. In comparison to X2 based LTE handover within the same S-GW, our proposed method for handover within the same gateway of the LayBack gateway layer achieves 69% reduction of signalling load compared to the LTE MME, and 2) 60% reduction in the overall signalling cost. Four steps are employed in the handover protocol, as illustrated in FIG. 6.

Step 1 Handover Preparation

When a measurement report satisfying the handover conditions arrives at the Serving eNodeB (SeNB) 604, the device bearer context information is forwarded to the Target eNode (TeNB) 606 and a message requesting handover is sent from the SeNB to the LayBack SDN Orchestrator 610, which is a control entity designated by the LayBack controller pool. Information related to the neighboring nodes at the radio node is configured by the SDN Orchestrator 610.

Step 2 Anchor Node Selection

We refer to the network entity that is selected for the user traffic duplication for the handover of a particular device as an Anchor Node (AN) 608. Each AN 608 is selected based on the traffic duplication capability and proximity to the device such that signaling load, and connection reestablishment are minimized. The LayBack SDN Orchestrator 610 configures the SDN traffic duplication mechanism at the AN 608 for all downlink traffic related to the device 602 waiting to be handed over. The AN 608 continuously changes the headers (tunnel IDs) such that traffic related to the device reaches at TeNB 606. Once the traffic duplication is in place, the SeNB 604 sends a Handover command to the device 602 (i.e., RRC reconfiguration in LTE).

Step 3 Perform Wireless Handover

Upon receiving the handover command, the device 602 breaks the current wireless link (a hard handover) and establishes a new wireless connection to the TeNB 606. By then, duplicated traffic arrived prior to wireless connection reestablishment is waiting to be forwarded to the device in the new connection.

Step 4 Background LayBack Synchronization

When the device traffic flow path through the new wireless connection is successful in both the uplink and downlink, the TeNB 606 sends a handover complete message to the SDN Orchestrator 610. Then, a backhaul synchronization process is performed to update the current state of the device 602 with the core network.

anchor node is an SDN-Switch. We observe from Table 2 that the overall signaling cost is reduced from 15 messages in LTE to 6 messages in the proposed intra-LayBack handover, a 60% reduction of signaling overhead. It is noted that an OpenFlow message sent from the controller to an SDN switch is counted as a signaling message in this evaluation. It is further observed from Table 2 that the load of processing 9 handover signaling messages at the MME in LTE is reduced to processing 4 handover signaling messages at the controller in LayBack. Moreover, the P/S-GWs in LTE need to process 4 signaling messages for a handover, whereas the LayBack gateway is completely oblivious to the handover mechanism. That is, the LayBack handover completely eliminates the handover signaling load on the gateway.

TABLE 1

Handover cost and load comparison in LayBack and LTE backhaul

| Spec. | LTE Description | LayBack Description | Signalling Cost LTE | Signalling Cost LayBack | LTE GW Load MME | LTE GW Load P/S-GW | LayBack Load Controller | LayBack Load Gateway |
|---|---|---|---|---|---|---|---|---|
| TS 36 423 | Handover Request (prep.), SeNB to TeNB | Handover Request (Bearer Info), SeNB to TeNB | 1 | 1 | 0 | 0 | 0 | 0 |
| | Handover Request ACK (prep.), TeNB to SeNB | Not Required | 1 | 0 | 0 | 0 | 0 | 0 |
| | Forwarding of Data, SeNB to TeNB | Not Required | 1 | 0 | 0 | 0 | 0 | 0 |
| TS 36 413 | Handover Required, SeNB to MME | Handover Required, SeNB to Controller (Pipelined) | 1 | 1 | 1 | 0 | 1 | 0 |
| | Handover Command, MME to SeNB | OpenFlow Msg. Dup. Traffic, Controller to Switch | 1 | 1 | 1 | 0 | 1 | 0 |
| | Handover Request, MME to TeNB | Not Required | 1 | 0 | 1 | 0 | 0 | 0 |
| | Handover Request ACK, TeNB to MME | Not Required | 1 | 0 | 1 | 0 | 0 | 0 |
| | Not Required | Ready for Handover, HO Req. ACK, TeNB to SeNB | 0 | 1 | 0 | 0 | 0 | 0 |
| | Handover Notify (UE arrival), TeNB to MME | Handover Notify (UE arrival), TeNB to Controller | 1 | 1 | 1 | 0 | 1 | 0 |
| | Path Switch Req., TeNB to MME | Not Required | 1 | 0 | 1 | 0 | 0 | 0 |
| TS 23.401 | Modify Bearer Request, MME to S-GW | Not Required | 1 | 0 | 1 | 1 | 0 | 0 |
| | Modify Bearer Request, S-GW to P-GW | Not Required | 1 | 0 | 0 | 1 | 0 | 0 |
| | Modify Bearer Response, P-GW to S-GW | Not Required | 1 | 0 | 0 | 1 | 0 | 0 |
| | Modify Bearer Response, S-GW to MME | Not Required | 1 | 0 | 1 | 1 | 0 | 0 |
| | Path Switch Req. ACK, MME to TeNB | Not Required | 1 | 0 | 1 | 0 | 0 | 0 |
| | Release Resource, TeNB to SeNB | OpenFlow Msg. Stop Dup., Controller to Switch | 1 | 1 | 0 | 0 | 1 | 0 |
| | | Total Cost | 15 | 6 | 9 | 4 | 4 | 0 |

Other handover types, such as inter-LayBack gateway 220 handover between different LayBack gateways, can be accomplished through extensions of the presented intra-LayBack handover.

Signaling Overhead Evaluation

Table 1 characterizes the amount of required signaling messages for X2-based handovers in LTE and for intra-LayBack handovers within the same gateway and if the The LTE handover changes the bearers (UE context) on the gateway, requiring overall a high handover signaling load, whereby large signaling loads have to be processed at the LTE MME and P/S-GW. In contrast, the LayBack handover reduces the overall signaling load and employs the SDN switches to change the packet flow path. Essentially, the LayBack handover moves the handover burden from the gateway to the network SDN switches. The SDN switches can share the handover burden, avoiding bottlenecks.

The procedures provided in the LayBack architecture handover may also be employed in any network supporting duplication of traffic and hence not limited to the LayBack architecture.

Interference Mitigation

Interference mitigation can be employed by any entity (other than the RADA) in any architecture (other than the LayBack Architecture). A mechanism allows dynamic assignment of the configuration to the radio nodes so as to abate power consumptions at the radio node and the user devices, and the interference levels.

Figure 7:
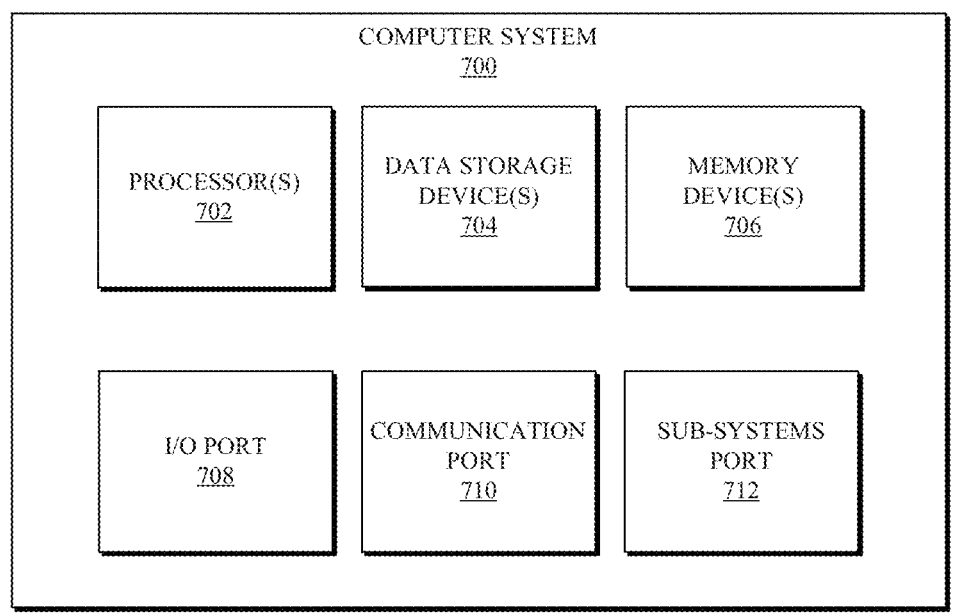
FIG. 7 is a simplified block diagram of a computer system.

Referring to FIG. 7, a detailed description of an example computing system 700 having one or more computing units that may implement various systems and methods discussed herein is provided. The computing system 700 may be applicable to the system described herein. For example, the computing system 700 may form a portion of the controller 214 of the LayBack architecture 210 of FIG. 2. It will be appreciated that specific implementations of these devices may be of differing possible specific computing architectures not all of which are specifically discussed herein but will be understood by those of ordinary skill in the art.

The computer system 700 may be a computing system is capable of executing a computer program product to execute a computer process. Data and program files may be input to the computer system 700, which reads the files and executes the programs therein. Some of the elements of the computer system 700 are shown in FIG. 7, including one or more hardware processors 702, one or more data storage devices 704, one or more memory devices 706, and/or one or more ports 708-712. Additionally, other elements that will be recognized by those skilled in the art may be included in the computing system 700 but are not explicitly depicted in FIG. 7 or discussed further herein. Various elements of the computer system 700 may communicate with one another by way of one or more communication buses, point-to-point communication paths, or other communication means not explicitly depicted in FIG. 7.

The processor 702 may include, for example, a central processing unit (CPU), a microprocessor, a microcontroller, a digital signal processor (DSP), and/or one or more internal levels of cache. There may be one or more processors 702, such that the processor comprises a single central-processing unit, or a plurality of processing units capable of executing instructions and performing operations in parallel with each other, commonly referred to as a parallel processing environment.

The computer system 700 may be a conventional computer, a distributed computer, or any other type of computer, such as one or more external computers made available via a cloud computing architecture. The presently described technology is optionally implemented in software stored on the data stored device(s) 704, stored on the memory device(s) 706, and/or communicated via one or more of the ports 708-712, thereby transforming the computer system 700 in FIG. 7 to a special purpose machine for implementing the operations described herein. Examples of the computer system 700 include personal computers, terminals, workstations, mobile phones, tablets, laptops, personal computers, multimedia consoles, gaming consoles, set top boxes, and the like.

The one or more data storage devices 704 may include any non-volatile data storage device capable of storing data generated or employed within the computing system 700, such as computer executable instructions for performing a computer process, which may include instructions of both application programs and an operating system (OS) that manages the various components of the computing system 700. The data storage devices 704 may include, without limitation, magnetic disk drives, optical disk drives, solid state drives (SSDs), flash drives, and the like. The data storage devices 704 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 706 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 704 and/or the memory devices 706, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 700 includes one or more ports, such as an input/output (I/O) port 708, a communication port 710, and a sub-systems port 712, for communicating with other computing, network, or vehicle devices. It will be appreciated that the ports 708-712 may be combined or separate and that more or fewer ports may be included in the computer system 700.

The I/O port 708 may be connected to an I/O device, or other device, by which information is input to or output from the computing system 700. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 700 via the I/O port 708. Similarly, the output devices may convert electrical signals received from computing system 700 via the I/O port 708 into signals that may be sensed as output by a human, such as sound, light, and/or touch. The input device may be an alphanumeric input device, including alphanumeric and other keys for communicating information and/or command selections to the processor 702 via the I/O port 708. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

In one implementation, a communication port 710 is connected to a network by way of which the computer system 700 may receive network data useful in executing the methods and systems set out herein as well as transmitting information and network configuration changes determined thereby. Stated differently, the communication port 710 connects the computer system 700 to one or more communication interface devices configured to transmit and/or receive information between the computing system 700 and other devices by way of one or more wired or wireless communication networks or connections. For example, the computer system 700 may be instructed to access information stored in a public network, such as the Internet. The computer 700 may then utilize the communication port to access one or more publicly available servers that store information in the public network. In one particular embodiment, the computer system 700 uses an Internet browser program to access a publicly available website. The website is hosted on one or more storage servers accessible through the public network. Once accessed, data stored on the one or more storage servers may be obtained or retrieved and stored in the memory device(s) 706 of the computer system 700 for use by the various modules and units of the system, as described herein.

Examples of types of networks or connections of the computer system 700 include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 710 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 710 may communicate with an antenna for electromagnetic signal transmission and/or reception.

The computer system 700 may include a sub-systems port 712 for communicating with one or more additional systems to perform the operations described herein. For example, the computer system 700 may communicate through the sub-systems port 712 with a large processing system to perform one or more of the calculations discussed above.

The system set forth in FIG. 7 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A network connectivity system comprising:
    a radio access network detection and assist (RADA) component configured to receive a broadcast message from a radio access network (RAN), the RADA component further configured to dynamically allocate resources to radio nodes of the RAN based on events, wherein the broadcast message from the RAN indicates a particular communication protocol of the radio nodes of the RAN, wherein the RADA component comprises a server that listens to the broadcast messages from the radio nodes of the RAN and assigns IP addresses of the controller and gateway to the radio nodes; and
    a controller configured to receive the broadcast message from the RADA component and to be in communication with a plurality of switching components of a network;
    wherein the controller configures the plurality of switching components of the network to process protocol-specific parameters for the radio nodes of the RAN based on the received broadcast message from the RAN.

2. The network connectivity system of claim 1, wherein the controller further configures a gateway pool to process protocol-specific parameters for the radio node of the RAN based on the received broadcast message from the RAN.

3. The network connectivity system of claim 1, wherein the controller is configured to process protocol-specific parameters for the radio node of the RAN based on the received broadcast message from the RAN.

4. The network connectivity system of claim 1 further comprising:
    an automatic discovery component for discovery and configuration of a first radio node and a second radio node of the radio access network.

5. The network connectivity system of claim 4 wherein the radio access network detection and assist component receives a request from the first radio node for a change in node configuration and the radio access network detection and assist component dynamically reallocates resources of the plurality of switching components of the network in response to the received request.

6. The network connectivity system of claim 1 wherein the controller receives a handover request from a serving radio node and transmits a traffic duplication instruction to a corresponding anchor node, the anchor node comprising a switch of the plurality of switching components or a gateway of a plurality of gateway components.

7. The network connectivity system of claim 6 wherein the anchor node alters a header of communications of a handover to a target radio node in response to the traffic duplication instruction from the controller.

8. The network connectivity system of claim 7 wherein the controller receives a handover complete message from the target radio node upon completion of the handover for the communications and updates a current state of a device with the network.

9. The network connectivity system of claim 1, wherein the resources comprise one or more of center-frequency, bandwidth, and duration.

* * * * *